US00RE47845E

(19) United States
(12) Reissued Patent
Wong et al.

(10) Patent Number: US RE47,845 E
(45) Date of Reissued Patent: Feb. 4, 2020

(54) DEVICE, SYSTEM AND METHOD FOR CONTENT-ADAPTIVE RESOLUTION-ENHANCEMENT

(71) Applicant: CHRISTIE DIGITAL SYSTEMS USA, INC., Cypress, CA (US)

(72) Inventors: Alexander Wong, Waterloo (CA); Yaguang Li, Milton (CA); Mark Lamm, Mississagua (CA); Hicham Sekkati, Longueuil (CA)

(73) Assignee: CHRISTIE DIGITAL SYSTEMS USA, INC., Cypress, CA (US)

(21) Appl. No.: 15/821,791

(22) Filed: Nov. 23, 2017

Related U.S. Patent Documents

Reissue of:
(64) Patent No.: 9,736,442
Issued: Aug. 15, 2017
Appl. No.: 15/250,429
Filed: Aug. 29, 2016

(51) Int. Cl.
*H04N 9/31* (2006.01)
*H04N 7/01* (2006.01)
*H04N 11/20* (2006.01)

(52) U.S. Cl.
CPC ..... *H04N 9/3188* (2013.01); *H04N 9/3147* (2013.01)

(58) Field of Classification Search
CPC .. H04N 9/3188; C11D 11/0082; C11D 17/06; C11D 17/065; C11D 1/146; C11D 1/22; C11D 1/29; C11D 1/37; C11D 1/72; C11D 1/83
See application file for complete search history.

(56) References Cited

U.S. PATENT DOCUMENTS 6,078,038 A 6/2000 Cooper
6,245,470 B1 * 6/2001 Kamon ..... G02B 27/0025 250/201.2
6,340,994 B1 1/2002 Margulis et al.
7,030,894 B2 4/2006 Allen et al.
(Continued)

OTHER PUBLICATIONS

EPO, Extended European Search Report, dated Feb. 20, 2018, re European Patent Application No. 17178178.4.
(Continued)

*Primary Examiner* — Peng Ke
(74) *Attorney, Agent, or Firm* — Perry + Currier, Inc.

(57) ABSTRACT

A device, system and method for content-adaptive resolution-enhancement is provided. A plurality of subframe streams are generated from a video stream, each of the plurality of subframe streams comprising a lower resolution version of the video stream, pixel-shifted from one another. A plurality of output subframe streams are generated from the plurality of subframe streams in a one-to-one relationship by: applying a plurality of video enhancement filters to each of the plurality of subframe streams, each of the plurality of video enhancement filters for enhancing different features of the video stream; and, combining one or more resulting enhanced subframe streams into a respective output subframe stream based on data in one or more regions of the video stream. One or more projectors are controlled to project the plurality of output subframe streams to combine the plurality of output subframe streams into a higher resolution projected video stream.

15 Claims, 12 Drawing Sheets

100

(56) References Cited

U.S. PATENT DOCUMENTS

2004/0233276 A1* 11/2004 Palovuori ..... G02B 27/2264 348/56
2006/0261996 A1* 11/2006 Augusto ..... H03M 1/125 341/155
2007/0024824 A1* 2/2007 Damera-Venkata ... G03B 21/14 353/94
2007/0132967 A1* 6/2007 Damera-Venkata ..... G03B 21/005 353/121
2008/0024469 A1* 1/2008 Damera-Venkata ..... H04N 9/3147 345/204
2008/0043209 A1* 2/2008 Widdowson ..... G03B 21/26 353/94
2008/0095363 A1* 4/2008 DiCarto ..... H04N 9/3179 380/203
2008/0101725 A1* 5/2008 Lin ..... G06K 9/3216 382/286
2008/0143978 A1* 6/2008 Damera-Venkata ..... G09G 3/002 353/94
2008/0170026 A1* 7/2008 Ishihara ..... G09G 3/3666 345/99
2008/0232452 A1* 9/2008 Sullivan ..... H03H 17/0294 375/232
2009/0175537 A1* 7/2009 Tribelhorn ..... G06K 9/00463 382/173
2010/0195003 A1* 8/2010 Saigo ..... H04N 5/142 348/745
2011/0058049 A1* 3/2011 Grindstaff ..... G06T 3/0006 348/208.4
2011/0116682 A1* 5/2011 Wang ..... G06K 9/00771 382/103
2012/0026157 A1* 2/2012 Unkel ..... G09G 3/003 345/419
2012/0082242 A1* 4/2012 Narroschke ..... H04M 19/423 375/240.25
2012/0242910 A1* 9/2012 Ivashin ..... H04N 9/3147 348/745
2012/0320200 A1* 12/2012 Majumder ..... G06F 3/017 348/143
2013/0113683 A1* 5/2013 Kitajima ..... G03B 37/04 345/1.2
2013/0208189 A1 8/2013 White et al.
2013/0242820 A1* 9/2013 Choi ..... H04W 72/042 370/280
2014/0160443 A1* 6/2014 Nakayama ..... G03B 3/04 355/69
2014/0347475 A1* 11/2014 Divakaran ..... G06K 9/00771 348/135
2015/0117776 A1* 4/2015 Mizuno ..... G09G 5/04 382/167

OTHER PUBLICATIONS

Non-Final Rejection dated Jan. 26, 2017 for U.S. Appl. No. 15/250,429.
Notice of Allowance dated Jun. 27, 2017, by USPTO, for U.S. Appl. No. 15/250,429; 11 pages.
Allen, W. and Ulichney, R. (2005), 47.4: Invited Paper: Wobulation: Doubling the Addressed Resolution of Projection Displays. SID Symposium Digest of Technical Papers, 36: 1514-1517. doi:10.1889/1.2036298.
Barshan, E., Lamm, M., Scharfenberger, C., & Fieguth, P. (Jun. 2015). 35.3: Resolution Enhancement Based on Shifted Superposition. In SID Symposium Digest of Technical Papers (vol. 46, No. 1, pp. 514-517).
Berthouzoz, F., & Fattal, R. (2012). Resolution enhancement by vibrating displays. ACM Transactions on Graphics (TOG), 31(2), 15., 14 pages. DOI: https://doi.org/10.1145/2159516.2159521.
Berthouzoz, F., & Fattal, R. (Aug. 2012). Apparent resolution enhancement for motion videos. In Proceedings of the ACM Symposium on Applied Perception (pp. 91-98). ACM.
Borman, S., & Stevenson, R. L. (1999). Simultaneous multi-frame MAP super-resolution video enhancement using spatio-temporal priors. In Image Processing, 1999. ICIP 99. Proceedings. 1999 International Conference on (vol. 3, pp. 469-473). IEEE.
Castagno, R., Haavisto, P., & Ramponi, G. (1996). A method for motion adaptive frame rate up-conversion. IEEE Transactions on circuits and Systems for Video Technology, 6(5), 436-446.
Chan, S. H., Wu, T. X., & Nguyen, T. Q. (2010). Comparison of two frame rate conversion schemes for reducing LCD motion blurs. IEEE Signal Processing Letters, 17(9), 783-786.
Choi, B. D., Han, J. W., Kim, C. S., & Ko, S. J. (2007). Motion-compensated frame interpolation using bilateral motion estimation and adaptive overlapped block motion compensation. IEEE Transactions on Circuits and Systems for Video Technology, 17(4), 407-416.
Damera-Venkata, N., & Chang, N. L. (Jun. 2007). Realizing super-resolution with superimposed projection. In Computer Vision and Pattern Recognition, 2007. CVPR'07. IEEE Conference on (pp. 1-8).
Damera-Venkata, N., & Chang, N. L. (Sep. 2007). On the resolution limits of superimposed projection. In Image Processing, 2007. ICIP 2007. IEEE International Conference on (vol. 5, pp. V-373). IEEE.
Damera-Venkata, N., & Chang, N. L. (2009). Display supersampling. ACM Transactions on Graphics (TOG), 28(1), 9.
Damera-Venkata, N., Chang, N., & Dicarlo, J. (2007). A unified paradigm for scalable multi-projector displays. IEEE Transactions on Visualization and Computer Graphics, 13(6), 1360-1367.
Didyk, P., Eisemann, E., Ritschel, T., Myszkowski, K., & Seidel, H. P., (2010). Apparent display resolution enhancement for moving images. ACM Transactions on Graphics (TOG), 29(4), 113:1-8.
Garcia-Dorado, I., & Cooperstock, J. (Jun. 2011). Fully automatic multi-projector calibration with an uncalibrated camera. In Computer Vision and Pattern Recognition Workshops (CVPRW), 2011 IEEE Computer Society Conference on (pp. 29-36). IEEE.
Haseyama, M., Izumi, D., & Takizawa, M. (Mar. 2010). Spatio-temporal resolution enhancement of video sequence based on super-resolution reconstruction. In Acoustics Speech and Signal Processing (ICASSP), 2010 IEEE International Conference on (pp. 870-873). IEEE.
Hoppe, H., DeRose, T., Duchamp, T., McDonald, J., & Stuetzle, W. (1992). Surface reconstruction from unorganized points (vol. 26, No. 2, pp. 71-78). ACM.
Hui-Ping, D., Li, Y., Wei, X., Qing-Di, H., & Rong, L. (Sep. 2009). Adaptive interpolation/extrapolation and motion vector processing method for frame rate up conversion. In Image and Graphics, 2009. ICIG'09. Fifth International Conference on (pp. 18-22). IEEE.
Hutchison, D.C., "The SmoothPicture Algorithm: An Overview," Digital TV DesignLine, Feb. 21, 2007, 4 pages, Texas Instruments, Dallas, TX.
Jaynes, C., & Ramakrishnan, D. (Oct. 2003). Super-resolution composition in multi-projector displays. In IEEE Int'l Workshop on Projector-Camera Systems (vol. 8).
Kim, J. H., Ko, Y. H., Kang. H. S., Lee, S. W., & Kwon, J. W. (2014). Frame rate up-conversion method based on texture adaptive bilateral motion estimation. IEEE Transactions on Consumer Electronics, 60(3), 445-452.
Liu, Y., Wong, A., & Fieguth, P. (Sep. 2011). A structure-guided conditional sampling model for video resolution enhancement. In Image Processing (ICIP), 2011 18th IEEE International Conference on (pp. 1169-1172). IEEE. Chicago.
Okatani, T., Wada, M., & Deguchi, K. (2009). Study of image quality of superimposed projection using multiple projectors. IEEE Transactions on Image Processing, 18(2), 424-429.
Ozkalayc, B., Alatan, A. A., & Bastug, A. (Sep. 2011). Occlusion adaptive frame rate up-conversion. In Consumer Electronics-Berlin (ICCE-Berlin), 2011 IEEE International Conference on (pp. 165-167). IEEE.
Said, A. (2006). Analysis of Systems for Superimposing Projected Images. Hewlett Packard Laboratories Technical Report HPL-2006-129.

(56) References Cited

OTHER PUBLICATIONS

Said. A. (Oct. 2006). Analysis of subframe generation for superimposed images. In Image Processing, 2006 IEEE International Conference on (pp. 401-404). IEEE.
Sajadi, B., Gopi, M., & Majumder, A. (2012). Edge-guided resolution enhancement in projectors via optical pixel sharing. ACM Transactions on Graphics (TOG), 31(4), 79.
Shah, N. R., & Zakhor, A. (Sep. 1996). Multiframe spatial resolution enhancement of color video. In Image Processing, 1996. Proceedings., International Conference on (vol. 1, pp. 985-988). IEEE.
Stengel, M., Eisemann, M., Wenger, S., Hell, B., & Magnor, M. (2013). Optimizing apparent display resolution enhancement for arbitrary videos. IEEE Transactions on Image Processing, 22(9), 3604-3613.
Sweet, B. T., & Kato, K. H. (2012) 120 Hertz—The New 60 for Flight Simulation?. Image 2012 Conference. Jun. 2012.
Templin, K., Didyk, P., Ritschel, T., Eisemann, E., Myszkowski, K., & Seidel, H. P. (Apr. 2011). Apparent resolution enhancement for animations. In Proceedings of the 27th Spring Conference on Computer Graphics (pp. 57-64). ACM.
Wong, et al. "Device, System and Method for Content-Adaptive Resolution-Enhancement" U.S. Appl. No. 15/250,429, filed Aug. 29, 2016.

* cited by examiner

100

100

DEVICE, SYSTEM AND METHOD FOR CONTENT-ADAPTIVE RESOLUTION-ENHANCEMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The specification relates generally to display devices and projectors, and specifically to a device, system and method for content-adaptive resolution-enhancement.

BACKGROUND

High-definition projectors and/or displays have become ubiquitous, but the resolution of current digital cameras, digital video cameras and cinema movie cameras can capture images up to one order of magnitude higher than these projectors and/or displays can currently provide at least in part due to the cost of producing high definition projectors and/or displays. Hence, the quality of projected video plays a huge role in the digital projector market. For example, while 4K, UHD (ultra-high-definition), and/or 8K video is available, projectors cannot generally project such high resolution video; rather, lower resolution WQXGA (wide-quad-extended-graphics-array) projectors are more readily available. Computational methods to increase the quality of projected video at lower costs are still in their infancy. Hence, when high resolution video is projected and/or displayed, downsampling procedures are used to decrease resolution so that the high resolution video can be rendered by a lower resolution projectors and/or displays, which can result in the loss of fine details such as fur, hair or general high-frequency image features, and can further result in additional motion artifacts (e.g. in addition to motion artifacts that might already be in the high resolution video).

SUMMARY

In general, this disclosure is directed to a device, system and method for content-adaptive resolution-enhancement. In particular, a high resolution video stream is decomposed into a plurality of lower resolution substreams that are pixel-shifted from one another but at the same and/or similar aspect ratio as the high resolution video stream. Different video enhancement filters are applied to each substream to enhance different types of features in each substream, for example moving objects, still objects, text, and the like; application of the different video enhancement filters result in generation of a plurality of enhanced subframe streams for each of the plurality of substreams. For each substream, one or more of the enhanced subframe streams are combined into a respective output subframe stream; for example, in a video stream that has both a region with a moving object, and another region without moving objects, a portion of a first enhanced subframe stream, with moving objects enhanced, is combined with a portion of a second enhanced subframe stream, with still objects enhanced, to generate the respective output subframe stream. Each of the respective output subframe streams (e.g. one for each of the plurality of lower-resolution substreams) are projected by one or more projectors to combine the respective output subframe streams into a higher resolution projected video stream. For example, each projector uses different pixel registrations to project a respective output subframe streams such combined at a surface onto which they are being projected to form a higher resolution video stream of a similar resolution to the original high resolution video stream. Alternatively, the respective output subframe streams could be combined in other ways, for example using a vibrating display device and/or displays and/or projectors with opto-mechanical shifters.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a device comprising: a controller and a communication interface configured to communicate with one or more projectors, the controller configured to: generate a plurality of subframe streams from a video stream; each of the plurality of subframe streams comprising a lower resolution version of the video stream, pixel-shifted from one another; generate a plurality of output subframe streams from the plurality of subframe streams in a one-to-one relationship by: applying a plurality of video enhancement filters to each of the plurality of subframe streams, each of the plurality of video enhancement filters for enhancing different features of the video stream; and, combining one or more resulting enhanced subframe streams into a respective output subframe stream based on data in one or more regions of the video stream; and, control, using the communication interface, the one or more projectors to project the plurality of output subframe streams, thereby combining the plurality of output subframe streams into a higher resolution projected video stream.

The controller can be further configured to generate the plurality of subframe streams by one more of resampling, upsampling and downsampling the video stream.

The controller can be further configured to apply one or more of the plurality of video enhancement filters to each of the plurality of subframe streams by: converting each of the plurality of subframe streams from a spatial domain to a frequency domain; applying a respective video enhancement filter in the frequency domain; and converting the respective output subframe stream back to the spatial domain.

The controller can be further configured to apply one or more of the plurality of video enhancement filters to each of the plurality of subframe streams by: applying a respective video enhancement filter in a spatial domain.

The plurality of video enhancement filters can comprise: a first enhancement video filter for enhancing moving objects in the video stream, and a second enhancement video filter for enhancing static objects in the video stream. The one or more resulting enhanced subframe streams can comprise a first enhanced subframe stream enhanced for the moving objects, and a second enhanced subframe stream enhanced for the static objects. The controller can be further configured to combine the first enhanced subframe stream and the second enhanced subframe stream into the respective output subframe stream based on the data in the one or more regions of the video stream by: determining respective regions where the moving objects and the static objects are located in the video stream; and including corresponding portions of the first enhanced subframe stream in moving object regions and including corresponding portions of the second enhanced subframe stream in static object regions.

The controller can be further configured to determine the data in the one or more regions of the video stream by comparing successive frames of the video stream.

The plurality of video enhancement filters can comprise one or more of: a moving object video enhancement filter, a static object video enhancement filter, a text enhancement filter, a texture enhancement filter, and a color enhancement filter.

The controller can be further configured to apply a compensation filter to each of respective enhanced subframe streams, the compensation filter for compensating for optical aberrations of the one or more projectors.

Another aspect of the specification provides a method comprising: at a device configured to communicate with one or more projectors, generating, at the device, a plurality of subframe streams from a video stream; each of the plurality of subframe streams comprising a lower resolution version of the video stream, pixel-shifted from one another; generating, at the device, a plurality of output subframe streams from the plurality of subframe streams in a one-to-one relationship by: applying a plurality of video enhancement filters to each of the plurality of subframe streams, each of the plurality of video enhancement filters for enhancing different features of the video stream; and, combining one or more resulting enhanced subframe streams into a respective output subframe stream based on data in one or more regions of the video stream; and, controlling, using the device, the one or more projectors to project the plurality of output subframe streams, thereby combining the plurality of output subframe streams into a higher resolution projected video stream.

The method can further comprise generating, at the device, the plurality of subframe streams by one more of resampling, upsampling and downsampling the video stream.

The method can further comprise applying, at the device, one or more of the plurality of video enhancement filters to each of the plurality of subframe streams by: converting each of the plurality of subframe streams from a spatial domain to a frequency domain; applying a respective video enhancement filter in the frequency domain; and converting the respective output subframe stream back to the spatial domain.

The method can further comprise applying, at the device, one or more of the plurality of video enhancement filters to each of the plurality of subframe streams by: applying a respective video enhancement filter in a spatial domain. The plurality of video enhancement filters can comprise: a first enhancement video filter for enhancing moving objects in the video stream, and a second enhancement video filter for enhancing static objects in the video stream. The one or more resulting enhanced subframe streams can comprise a first enhanced subframe stream enhanced for the moving objects, and a second enhanced subframe stream enhanced for the static objects. The method can further comprise combining, at the device, the first enhanced subframe stream and the second enhanced subframe stream into the respective output subframe stream based on the data in the one or more regions of the video stream by: determining respective regions where the moving objects and the static objects are located in the video stream; and including corresponding portions of the first enhanced subframe stream in moving object regions and including corresponding portions of the second enhanced subframe stream in static object regions.

The method can further comprise determining, at the device, the data in the one or more regions of the video stream by comparing successive frames of the video stream.

The plurality of video enhancement filters can comprise one or more of: a moving object video enhancement filter, a static object video enhancement filter, a text enhancement filter, a texture enhancement filter, and a color enhancement filter.

The method can further comprise applying, at the device, a compensation filter to each of respective enhanced subframe streams, the compensation filter for compensating for optical aberrations of the one or more projectors.

Another aspect of the specification provides a computer-readable medium storing a computer program, wherein execution of the computer program is for: at a device configured to communicate with one or more projectors, generating, at the device, a plurality of subframe streams from a video stream; each of the plurality of subframe streams comprising a lower resolution version of the video stream, pixel-shifted from one another; generating, at the device, a plurality of output subframe streams from the plurality of subframe streams in a one-to-one relationship by: applying a plurality of video enhancement filters to each of the plurality of subframe streams, each of the plurality of video enhancement filters for enhancing different features of the video stream; and, combining one or more resulting enhanced subframe streams into a respective output subframe stream based on data in one or more regions of the video stream; and, controlling, using the device, the one or more projectors to project the plurality of output subframe streams, thereby combining the plurality of output subframe streams into a higher resolution projected video stream. The computer-readable medium can comprise a non-transitory computer-readable medium

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
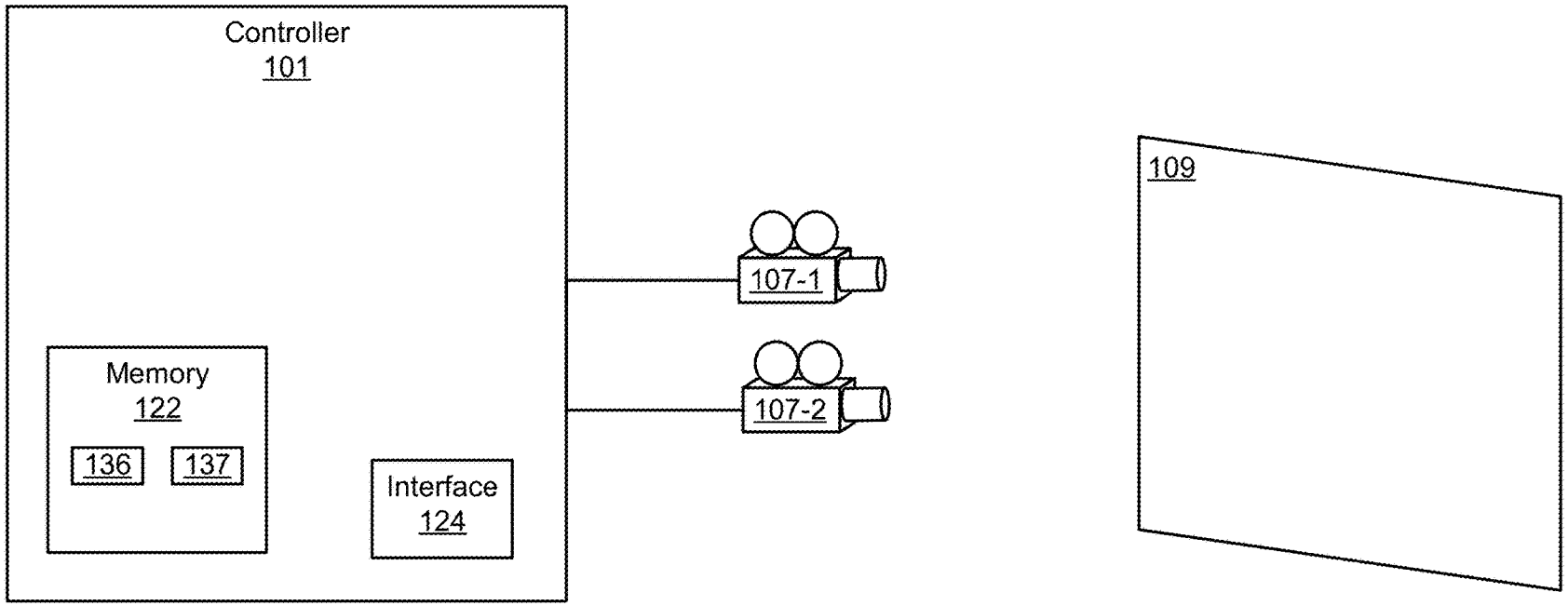
FIG. 1 depicts a system for content-adaptive resolution-enhancement, according to non-limiting implementations.

Attention is directed to FIG. 1 which depicts a system 100 for content-adaptive resolution-enhancement, according to non-limiting implementations. System 100 comprises a controller 101 and one or more projectors 107-1, 107-2, which are interchangeably referred to hereafter, collectively, as projectors 107 and generically as a projector 107. As depicted, system 100 further comprises a screen 109 upon which images from projectors 107 are projected. Controller 101 is generally configured to provide output subframe streams to projectors 107 which are used by projectors 107 to project images onto screen 109, as described in more detail below.

As depicted, controller 101 comprises a memory 122 and a communication interface 124 (interchangeably referred to as interface 124) configured to communicate with one or more projectors 107. Controller 101 is configured to: generate a plurality of subframe streams from a video stream; each of the plurality of subframe streams comprising a lower resolution version of the video stream, pixel-shifted from one another; generate a plurality of output subframe streams from the plurality of subframe streams in a one-to-one relationship by: applying a plurality of video enhancement filters to each of the plurality of subframe streams, each of the plurality of video enhancement filters for enhancing different features of the video stream; and, combining one or more resulting enhanced subframe streams into a respective output subframe stream based on data in one or more regions of the video stream; and, control, using the communication interface 124, one or more projectors 107 to project the plurality of output subframe streams thereby combining the plurality of output subframe streams into a higher resolution projected video stream.

While two projectors 107 are depicted, system 100 can comprise more than two projectors 107 and as few as one projector 107. Each projector 107 comprises a projector configured to project images, including but not limited to a digital projector, a cinema projector, an LCOS (Liquid Crystal on Silicon) based projector, a DMD (digital multi-mirror device) based projector and the like. In particular, one or more projectors 107 are configured to project pixel-shifted images and combine them into a higher resolution image. For example, each of projectors 107 can use different respective pixel registrations to project pixel-shifted images such that they are shifted and/or transformed with respect to one another at screen 109 such that similar regions in each of the pixel-shifted images are co-projected onto each other so form a higher resolution version thereof. When only one projector 107 is present in system 100, the one projector 107 can consecutively project the pixel-shifted images onto screen 109 such that an eye of a viewer combines the consecutively projected pixel-shifted images viewed on screen 109 into a higher resolution image; in some of these implementations, such a projector can include an opto-mechanical device configured to shift projected images that are, themselves, pixel-shifted from each other, thereby forming a higher resolution image. When two or more projectors 107 are present in system 100, the two or more projectors 107 can co-project the pixel-shifted images onto screen 109 thereby forming a higher resolution image.

Controller 101 can comprise any suitable computing device, including but not limited to a graphics processing unit (GPU), a graphics processing device, a graphics processing engine, a video processing device, a personal computer (PC), a server, and the like, and generally comprises memory 122 and communication interface 124 (interchangeably referred to hereafter as interface 124) and optionally a display device (not depicted) and at least one input device (not depicted) which, when present, can be external to controller 101 and in communication with controller 101 via interface 124.

Controller 101 further comprises a processor and/or a plurality of processors, including but not limited to one or more central processors (CPUs) and/or one or more processing units and/or one or more graphic processing units (GPUs); either way, controller 101 comprises a hardware element and/or a hardware processor. Indeed, in some implementations, controller 101 can comprise an ASIC (application-specific integrated circuit) and/or an FPGA (field-programmable gate array) specifically configured to implement the functionality of controller 101.

In other words, controller 101 can be specifically adapted for content-adaptive resolution-enhancement. Hence, controller 101 is preferably not a generic computing device, but a device specifically configured to implement specific geometric warping correction functionality in projection mapping. For example, controller 101 can specifically comprise a computer executable engine configured to implement specific content-adaptive resolution-enhancement, as described below.

Memory 122 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of controller 101 as described herein are typically maintained, persistently, in memory 122 and used by controller 101 which makes appropriate utilization of volatile storage during the execution of such programming instructions. Those skilled in the art recognize that memory 122 is an example of computer readable media that can store programming instructions executable by controller 101. Furthermore, memory 122 is also an example of a memory unit and/or memory module and/or a non-volatile memory.

Memory 122 generally stores an application 136 which, when processed by controller 101, enables controller 101 to: generate a plurality of subframe streams from a video stream; each of the plurality of subframe streams comprising a lower resolution version of the video stream, pixel-shifted from one another; generate a plurality of output subframe streams from the plurality of subframe streams in a one-to-one relationship by: applying a plurality of video enhancement filters to each of the plurality of subframe streams, each of the plurality of video enhancement filters for enhancing different features of the video stream; and, combining one or more resulting enhanced subframe streams into a respective output subframe stream based on data in one or more regions of the video stream; and, control, using the communication interface 124, one or more projectors 107 to project the plurality of output subframe streams, pixel-shifted from one another, thereby combining the plurality of output subframe streams into a higher resolution projected video stream.

Memory 122 can further store data 137 which, when processed by controller 101 can generate a high resolution video stream. Controller 101 can hence generally comprise an image generator and/or renderer, for example a computing device, a server and the like, configured to generate and/or render a video stream from data 137. Such data 137 can include, but is not limited to, still images, video and the like. Furthermore, controller 101 can be in communication with, and/or comprise, an image generator and/or a memory (which can include memory 122) storing data from which data 137 can be generated and/or rendered. Alternatively, controller 101 can generate data 137 (e.g. image data and/or video data) using algorithms, and the like, for generating a video stream.

In general, a resolution of each projector 107 is lower than a resolution of a video stream generated from data 137, and the like. Hence, it is appreciated that, herein, the terms "high resolution" and/or "higher resolution" and/or "low resolution" and/or "lower resolution", as applied herein refer to a relative resolution of an image modulator(s) at projector(s) 107 as compared to a resolution of a video stream produced from data 137 and/or by controller 101. Hence, before a video stream produced by controller 101 can be projected by projectors 107, the video stream is modified to a resolution compatible with projector(s) 107, as discussed in detail below.

Interface 124 comprises any suitable wired and/or wireless communication interface configured to communicate with projectors 107 in a wired and/or wireless manner as desired. Hence, communication links (represented as lines) between controller 101 and projectors 107 can be wired and/or wireless communication links.

While not depicted, controller 101 can further comprise a power source, including but not limited to a battery and/or a power pack, and/or a connection to a power, or any other suitable power source, as well as a housing and the like.

In any event, it should be understood that a wide variety of configurations for controller 101 are contemplated.

While not depicted system 100 and/or controller 101 can further comprise an alignment system, one or more cameras, a warping engine, and the like. Such components can be used to warp and/or align video streams and/or images for projection onto screen 109. Furthermore, while present implementations are described with respect to projecting video streams onto screen 109, in other implementations video streams can be projected onto other objects, including, but not limited to three-dimensional objects, for example in projection mapping applications. Similarly, in yet further implementations, a plurality of projectors 107 can project a plurality of video streams onto screen 109 (and/or three-dimensional objects, and the like) in image tiling applications.

Figure 2:
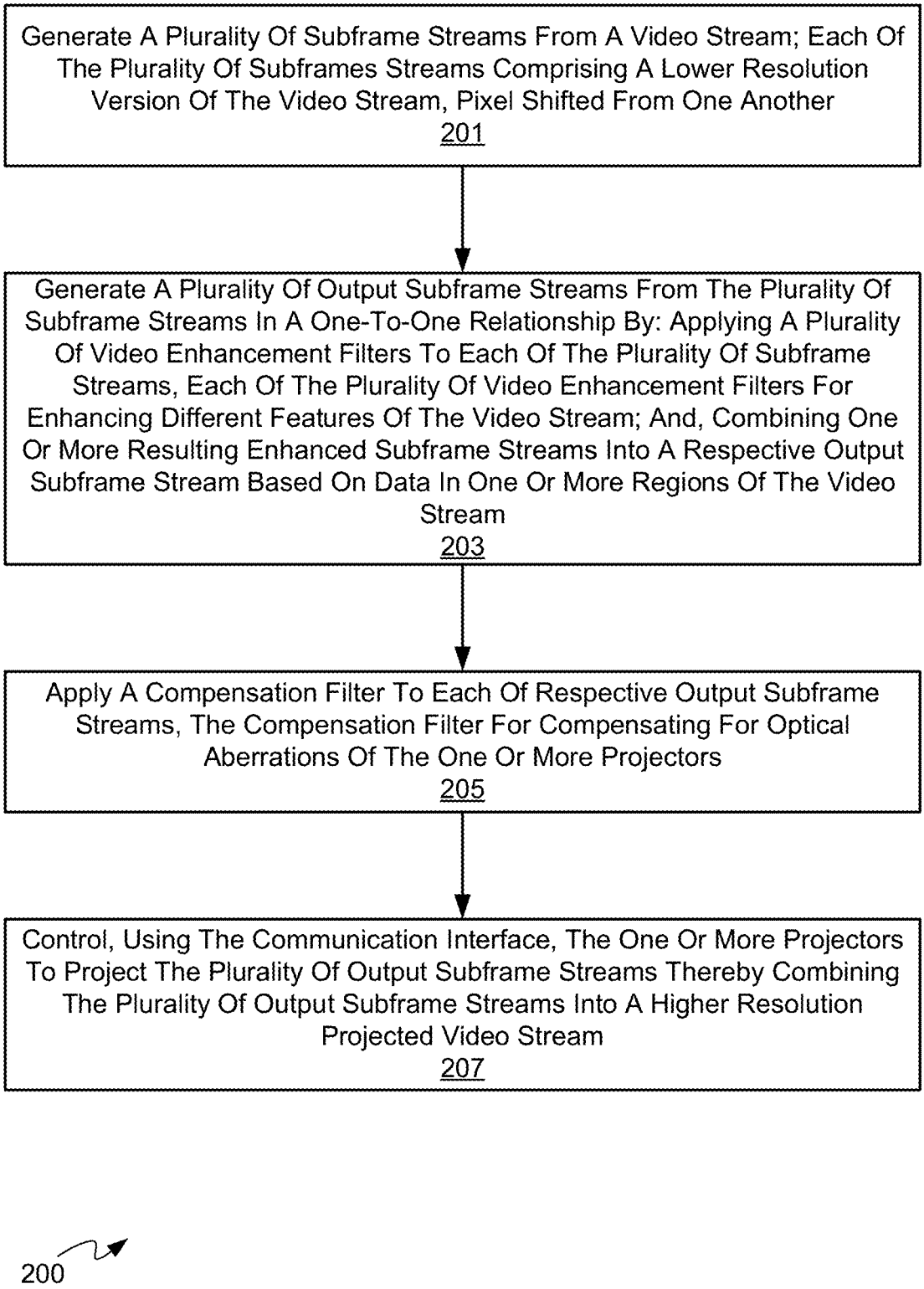
FIG. 2 depicts a flowchart of a method for content-adaptive resolution-enhancement, according to non-limiting implementations.

Attention is now directed to FIG. 2 which depicts a flowchart of a method 200 for geometric warping correction in projection mapping, according to non-limiting implementations. In order to assist in the explanation of method 200, it will be assumed that method 200 is performed using system 100, and specifically by controller 101, for example when controller 101 processes application 136. Indeed, method 200 is one way in which system 100 and/or controller 101 can be configured. Furthermore, the following discussion of method 200 will lead to a further understanding of controller 101, and system 100 and its various components. However, it is to be understood that system 100 and/or controller 101 and/or method 200 can be varied, and need not work exactly as discussed herein in conjunction with each other, and that such variations are within the scope of present implementations.

Regardless, it is to be emphasized, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well. Furthermore, while controller 101 is described as implementing and/or performing each block of method 200, it is appreciated that each block of method 200 occurs using controller 101 processing application 136.

At block 201, controller 101 generates a plurality of subframe streams from a video stream; each of the plurality of subframe streams comprising a lower resolution version of the video stream, pixel-shifted from one another.

At block 203, controller 101 generates a plurality of output subframe streams from the plurality of subframe streams in a one-to-one relationship by: applying a plurality of video enhancement filters to each of the plurality of subframe streams, each of the plurality of video enhancement filters for enhancing different features of the video stream; and, combining one or more resulting enhanced subframe streams into a respective output subframe stream based on data in one or more regions of the video stream.

At an optional block 205, controller 101 applies a compensation filter to each of respective output subframe streams, the compensation filter for compensating for optical aberrations of the one or more projectors. Block 205 can occur in conjunction with block 203, as described below.

At block 207, controller 101 controls, using communication interface 124, one or more projectors 107 to project the plurality of output subframe streams thereby combining the plurality of output subframe streams into a higher resolution projected video stream. For example, the plurality of output subframe streams can be projected shifted from one another, and/or using respective shifted pixel registrations as described below.

Method 200 will now be described with reference to FIG. 3 to FIG. 11.

Figure 3:
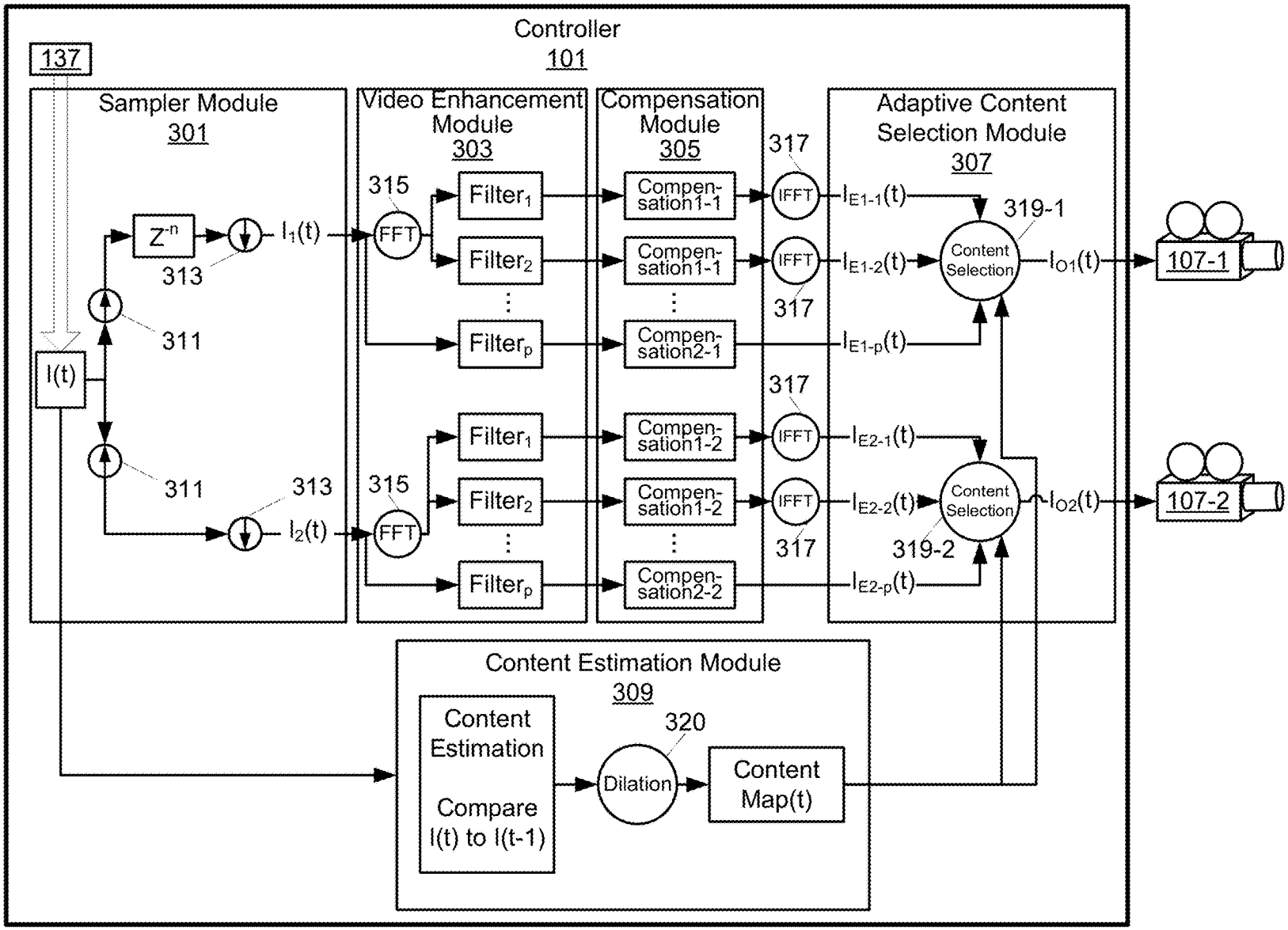
FIG. 3 depicts a module-based block diagram of a controller of the system of FIG. 1, according to non-limiting implementations.

Specifically, FIG. 3 depicts a module-based block diagram of controller 101 when processing application 136. In particular FIG. 3 depicts various functionality modules of controller 101 when processing application 136. However, the modules are depicted for clarity only and functionality of controller 101 (and/or application 136) need not be provided in a modular format.

In particular, in FIG. 3, five modules are depicted: a sampler module 301, a video enhancement module 303, a compensation module 305, an adaptive content selection module 307, and a content estimation module 309. While memory 122 and interface 124 are not depicted, it is appreciated that memory 122 and interface 124 are nonetheless present and controller 101 can make use of either of memory 122 and interface 124, at least when processing application 136; for example, while in FIG. 3, projectors 107 are depicted in communication with adaptive content selection module 307, controller 101 is understood to be in communication with projectors 107 using interface 124, as depicted in FIG. 1.

At sampler module 301, as depicted, controller 101 optionally generates a video stream I(t), for example using data 137; alternatively, video stream I(t) can be received from an external image generator. As depicted, video stream I(t) is represented as a function of time "t". In particular, video stream I(t) comprises frames and/or video frames, each of which can comprise images.

At sampler module 301, controller 101 generates (e.g. at block 201 of method 200), a plurality of subframe streams $I_1(t)$, $I_2(t)$ from video stream I(t); each of the plurality of subframe streams $I_1(t)$, $I_2(t)$ comprising a lower resolution version of video stream I(t), pixel-shifted from one another. Furthermore, each of plurality of subframe streams $I_1(t)$, $I_2(t)$ have a similar and/or the same aspect ratio as video stream I(t).

As depicted controller 101 generates two subframe streams $I_1(t)$, $I_2(t)$. For example, in FIG. 3, from video stream I(t), two branches are depicted, a first (top) branch corresponding to generation of a first subframe stream $I_1(t)$, and a second (bottom) branch corresponding to generation of a second subframe stream $I_2(t)$.

However, in other implementations, controller 101 can generate more than two, or "m", subframe streams $I_1(t)$, $I_2(t) \ldots I_m(t)$, and a number of branches from video stream I(t) can correspond to an "m" number of subframe streams $I_1(t)$, $I_2(t) \ldots I_m(t)$, each pixel-shifted from each other and having a similar and/or same aspect ratio as video stream I(t)

For example, a number of subframe streams $I_1(t)$, $I_2(t) \ldots I_m(t)$ generated can correspond to a number of projectors 101 (e.g. in system 100, m=2).

Alternatively, a number of subframe streams $I_1(t)$, $I_2(t) \ldots I_m(t)$ generated can correspond to a number of subframes that can be consecutively projected by a single projector 107 within a given time period, for example within a frame time period. For example, when only two subframes can be consecutively projected by a single projector within a frame time period, a number of subframe streams $I_1(t)$, $I_2(t) \ldots I_m(t)$ generated can comprise two subframe streams (e.g. m=2).

Alternatively, a number of subframe streams $I_1(t)$, $I_2(t) \ldots I_m(t)$ generated can be determined from a resolution of video stream I(t) (and/or a number of pixels in a frame of video stream I(t)) as compared to a resolution of projectors 107 (and/or a number of pixels in an image produced by a projector 107). For example, when video stream I(t) has a resolution that is twice that of projectors 107, two subframe streams can be generated (e.g. m=2); similarly, when video stream I(t) has a resolution that is three times that of projectors 107, three subframe streams can be generated (e.g. m=3). In other words, a number of subframe streams generated can be determined from a number of pixels in a frame of video stream I(t) as divided by a number of pixels in an image produced by a projector 107 (and/or a number of pixels of an image modulator of a projector 107).

For the remainder of the present specification, however, it will be assumed that m=2, and that controller 101 generates two subframe streams $I_1(t)$, $I_2(t)$ ((e.g. at block 201 of method 200).

Furthermore, subframe streams $I_1(t)$, $I_2(t)$ are pixel-shifted from one another. Such pixel shifting is represented in sampler module 301 by a shift operator $Z^{-n}$, where "n" is a number of pixels by which subframe streams $I_1(t)$, $I_2(t)$ are shifted. For example, for n=1, each of subframe streams $I_1(t)$, $I_2(t)$ are pixel-shifted from one another by one pixel (e.g. as described below with respect to FIG. 4).

Furthermore, controller 101 can be further configured to generate the plurality of subframe streams $I_1(t)$, $I_2(t)$ by one more of resampling, upsampling and downsampling video stream I(t). For example, as depicted, sampler module 301 comprises an optional upsampling function 311 and a downsampling function 313. Optional upsampling function 311 can be used by controller 101 to determine pixel data located between existing pixels of frames of video stream I(t). In other words, upsampling function 311 can comprise an interpolation function to determine image data between pixels of frames of video stream I(t). Downsampling function 313 can select pixels of video stream I(t), for example according to shift operator $Z^{-n}$. In particular, subframe stream $I_1(t)$ can be generated by upsampling video stream I(t) and applying shift operator $Z^{-n}$, followed by downsampling. In some implementations, an output linear resolution of each of subframe streams $I_1(t)$, $I_2(t)$ can be about $1/\sqrt{2}$ of an input linear resolution of video stream I(t) and pixel shifting between each of subframe streams $I_1(t)$, $I_2(t)$ can be about ½ pixel of the output linear resolution. As a result, upscaling by a factor of $\sqrt{2}$, shifting by 1 pixel and downscaling by a factor of 2 can occur However, shift operator $Z^{-n}$, upsampling function 311 and downsampling function 313 are appreciated to be examples only and any sampling functions, and the like, can be used to sample video stream I(t) to generate each of subframe streams $I_1(t)$, $I_2(t)$.

Figure 4:
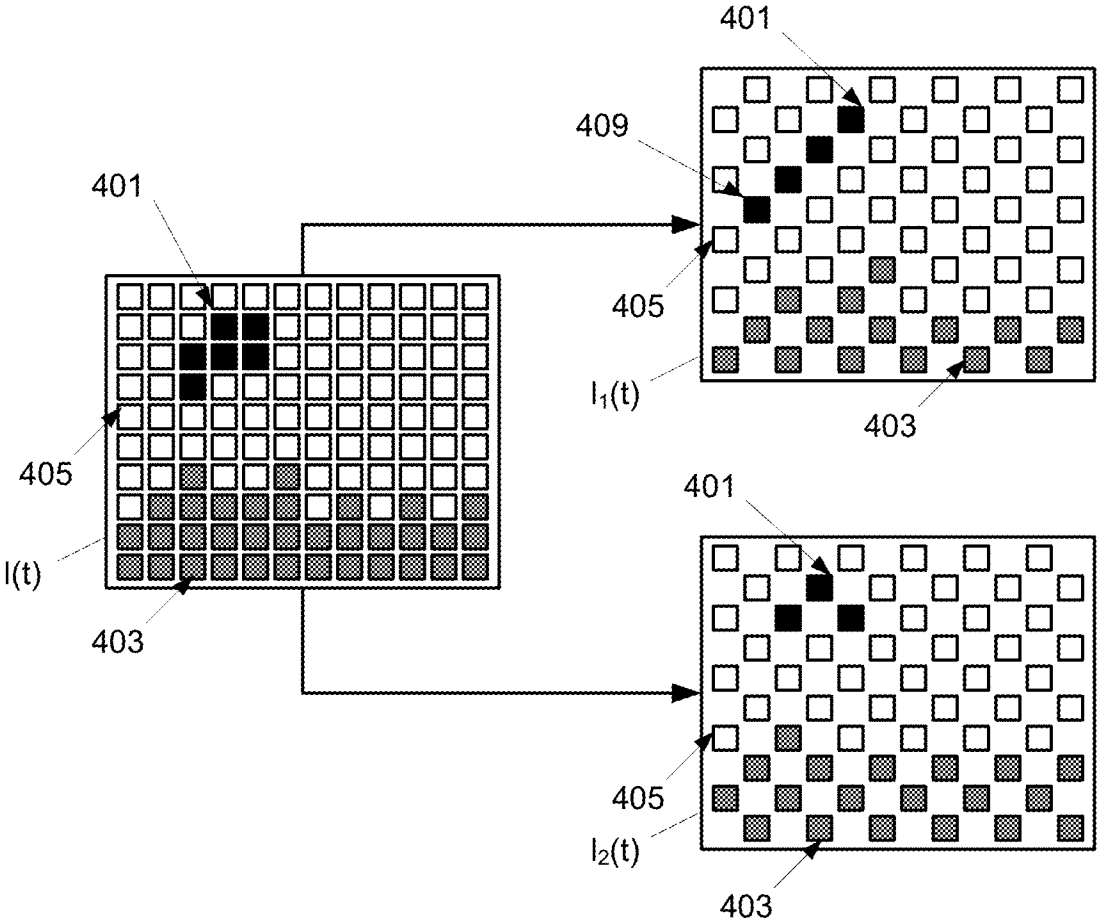
FIG. 4 depicts two lower resolution subframe streams being generated from a higher definition video stream, according to non-limiting implementations.

Attention is briefly directed to FIG. 4 which depicts a non-limiting example of a frame of video stream I(t), which includes a moving object 401 and a still and/or non-moving object and/or region 403. For example, moving object 401 can represent a ball being thrown over grass (or similar) in region 403. It is appreciated that the depicted frame includes areas where pixel values are changing rapidly (e.g. from frame to frame) and hence can be referred to as areas of high frequency pixel change associated with moving object 401; for example, if moving object 401 is ideally represented by a four pixels in a square, the two pixels in the lower left corner can represent areas which represent a previous position of moving object 401, and can represent, for example, blur (and the like) associated with moving object 401. Indeed, such areas can include artifacts and/or high frequency motion artifacts associated with regions where pixel values are changing rapidly from frame to frame.

Similarly, it is assumed that edges of region 403 of video stream I(t) are static and can be enhanced to emphasize features thereof.

A background region 405 can represent sky, and the like, which can also be non-moving and/or still. In other words, in a successive frame of video stream I(t), moving object 401 will have changed position, while regions 403, 405 will have not changed. In particular, moving object 401 changing position between frames of video stream I(t) refers to pixels in video stream I(t) changing state to represent moving object 401 moving across successive frames and/or successive images of video stream I(t).

While the frame of video stream I(t) is represented as being of a very low resolution (e.g. 10×12), it is appreciated that such a resolution is depicted merely to describe aspects of method 200 and that methods described herein can be applied to very high resolution video streams, including, but not limited to, 4K video streams, UHD (ultra-high definition) video streams, 8K video streams, and higher. Indeed, present implementations can be used to control one or more projectors, having a resolution lower than 4K resolution, to provide 4K video streams.

In any event, after applying at least operator $Z^{-n}$, with n=1, and downsampling function to video stream I(t) in a first instance, and downsampling function to video stream I(t) in a second instance, two subframe streams $I_1(t)$, $I_2(t)$ are generated, and FIG. 4 further depicts non-limiting examples of an image and/or a frame of each of subframe streams $I_1(t)$, $I_2(t)$ generated from the image and/or frame of video stream I(t) depicted in FIG. 4. Subframe streams $I_1(t)$, $I_2(t)$ are referred to as "subframe" streams as each frame of each of subframe streams $I_1(t)$, $I_2(t)$ can be indicative of and/or represent a subframe of an output video stream, as described in further detail below.

In particular, subframe stream $I_1(t)$ comprises every second pixel of video stream I(t) with pixels of each successive row of subframe stream $I_1(t)$ offset from a previous row by one pixel, the top row starting from the second pixel of the top row of the frame of video stream I(t) depicted in FIG. 4. Similarly, subframe stream $I_2(t)$ comprises every second pixel of video stream I(t) with pixels of each successive row of subframe stream $I_1(t)$ offset from a previous row by one pixel, the top row starting from the first pixel of the top row of the frame of video stream I(t) depicted in FIG. 4. Hence each of subframe streams $I_1(t)$, $I_2(t)$ are complementary to one another and when they are superimposed they form video stream I(t). Hence, subframe streams $I_1(t)$, $I_2(t)$ are pixel-shifted from one another, by one pixel.

For example, each of subframe streams $I_1(t)$, $I_2(t)$ include portions of each of moving object 401 and regions 403, 405.

While as depicted, each of subframe streams $I_1(t)$, $I_2(t)$ are pixel-shifted from one another by integer values, when upsampling function 311 is applied to video stream I(t), subframe streams $I_1(t)$, $I_2(t)$ can be pixel-shifted by fractions of a pixel as well.

As depicted, such pixel-shifting is similar for each pixel of each of each of subframe streams $I_1(t)$, $I_2(t)$, however pixel-shifting can include one or more of: different pixel shifts for each pixel of each of subframe streams $I_1(t)$, $I_2(t)$; different pixel shifts for different regions of each of subframe streams $I_1(t)$, $I_2(t)$; rotation of one or more pixels of each of subframe streams $I_1(t)$, $I_2(t)$; and a transformation of one or more pixels of each of subframe streams $I_1(t)$, $I_2(t)$. Hence, in some implementations, the term "pixel-shifted" can be understood to mean that every pixel is translated and/or rotated and/or transformed and/or shifted and/or scaled.

Furthermore, generation of each of subframe streams $I_1(t)$, $I_2(t)$ as depicted in FIG. 4 represents a non-limiting example of block 201 of method 200. However, such selection of every second pixel of video stream I(t) to generate each of subframe streams $I_1(t)$, $I_2(t)$ is appreciated to be a special example used to illustrate method 200; in practise, upsampling of video stream I(t) can occur, to interpolate pixels thereof to produce each of subframe streams $I_1(t)$, $I_2(t)$ in a grid rather than a checkerboard pattern, with average values used for pixels at edges of features of video stream I(t). Such implementations are described in more detail, below, with respect to FIG. 12.

Regardless, each of pixels in each of each of subframe streams $I_1(t)$, $I_2(t)$ are understood to have different pixel registrations that can be used by projectors 107 to project output subframe streams (produced from each of subframe streams $I_1(t)$, $I_2(t)$) shifted from one another at screen 109, as described below. For example, pixel registration of pixels of subframe stream $I_2(t)$ are shifted from pixel registration of pixels of subframe stream $I_1(t)$.

Furthermore, a resolution of each of subframe streams $I_1(t)$, $I_2(t)$ can correspond to a resolution of an image modulator of projectors 107. However, each of subframe streams $I_1(t)$, $I_2(t)$ has a similar and/or a same aspect ratio as video stream I(t).

The process of generating subframe streams $I_1(t)$, $I_2(t)$ can also lead to motion artifacts. For example, with reference to subframe streams $I_1(t)$, a motion artifact 409 has been erroneously added to moving object 401.

Returning to FIG. 3, each of subframe streams $I_1(t)$, $I_2(t)$ are received at video enhancement module 303, which comprises a plurality of video enhancement filters, indicated in FIG. 3 as "$Filter_1$", $Filter_2$" . . . "Filter" (e.g. "p" number of video enhancement filters), each of which are applied to each of subframe streams $I_1(t)$, $I_2(t)$, such that "p" number of enhanced subframe streams are generated for each of subframe streams $I_1(t)$, $I_2(t)$.

For example, the plurality of video enhancement filters can comprise one or more of: a moving object video enhancement filter, a static object video enhancement filter, a text enhancement filter, a texture enhancement filter, a color enhancement filter, and the like. In other words, each of the plurality of video enhancement filters are applied to each subframe stream $I_1(t)$, $I_2(t)$ to enhance content thereof, regardless of the actual content.

Hence, for example, the plurality of video enhancement filters can comprise: a first enhancement video filter (e.g. $Filter_1$) for enhancing moving objects in video stream I(t), and a second enhancement video filter (e.g. $Filter_2$) for enhancing static objects and/or still regions in video stream I(t). Such a first enhancement video filter (e.g. $Filter_1$) can comprise a high frequency suppression filter which can remove motion artifacts associated with moving objects in each of subframe streams $I_1(t)$, $I_2(t)$; similarly, a second enhancement video filter (e.g. $Filter_1$) can comprise a high frequency sharpening filter which can enhance edges of still objects and/or non-moving objects in each of subframe streams $I_1(t)$, $I_2(t)$.

Furthermore, as depicted, in some implementations, given video enhancement filters can be applied in a frequency domain. However, as depicted in FIG. 4, video stream I(t) and each of subframe streams $I_1(t)$, $I_2(t)$ can be in a spatial domain. Hence, prior to applying a given video enhancement filter, a Fourier Transform and/or a Fast Fourier Transform can be applied to each of subframe streams $I_1(t)$, $I_2(t)$, as represented by Fast Fourier Transform ("FFT") function 315 of video enhancement module 303. Once the given video enhancement filter is applied in a frequency domain, an inverse Fourier Transform and/or an inverse Fast Fourier Transform can be applied to a respective enhanced Fourier transformed subframe stream, as represented by Inverse Fast Fourier Transform ("IFFT") function 317 which can be part of video enhancement module 303 and/or (as depicted) applied after compensation filters of compensation module 305, as described below. For example, moving object video enhancement filter and/or static object video enhancement filter, and the like can be applied in the frequency domain.

Hence, controller 101 can be further configured (e.g. at block 203 of method 200) to apply one or more of the plurality of video enhancement filters (e.g. $Filter_1$, $Filter_2$) to each of the plurality of subframe streams $I_1(t)$, $I_2(t)$ by: converting each of the plurality of subframe streams $I_1(t)$, $I_2(t)$ from a spatial domain to a frequency domain (e.g. using FFT function 315); applying a respective video enhancement filter (e.g. $Filter_1$, $Filter_2$) in the frequency domain; and converting the respective output subframe stream back to the spatial domain (e.g. using IFFT function 317).

Alternatively, video enhancement filters can be applied in the spatial domain and not in the frequency domain; in such implementations, neither FFT function 315 nor IFFT function 317 is applied to subframe streams $I_1(t)$, $I_2(t)$. Hence, controller 101 can be further configured to apply one or more of the plurality of video enhancement filters to each of the plurality of subframe streams $I_1(t)$, $I_2(t)$ by: applying a respective video enhancement filter (e.g. Filter) in a spatial domain. For example, color enhancement filters and the like could be applied in the spatial domain.

In any event, as represented by arrows extending from each of video enhancement filters $Filter_1$, $Filter_2$ . . . . Filter, for each of subframe streams $I_1(t)$, $I_2(t)$, "p" enhanced subframe streams are generated for each of subframe streams $I_1(t)$, $I_2(t)$. For example, when only two video enhancement filters are applied, two enhanced subframe streams are generated for each of subframe streams $I_1(t)$, $I_2(t)$.

As depicted, controller 101 is further configured to apply (e.g. at block 205 of method 200, and at compensation module 305) a compensation filter to each of respective output subframe streams, the compensation filter for compensating for optical aberrations of the one or more projectors. Furthermore, such compensation filters can be applied in a frequency domain or a spatial domain. Furthermore, each compensation filter applied is particular to projector 107-1 or projector 107-2. For example, optical aberrations of each of projectors 107-1, 107-2 can be determined and a corresponding compensation filter can be configured to correct optical aberrations thereof in a corresponding subframe stream.

For example, as depicted, compensation module 305 comprises a compensation filter 1-1 configured to compensate a subframe stream (for example, subframe stream $I_1(t)$) for optical aberrations of projector 107-1, compensation filter 1-1 further configured to be applied in a frequency domain (e.g. after FFT function 315 is applied to a substream but before IFFT function 317 is applied to the substream). Similarly, compensation module 305 further comprises a compensation filter 2-1 configured to compensate a subframe stream (for example, subframe stream $I_1(t)$) for optical aberrations of projector 107-1, compensation filter 2-1 further configured to be applied in a spatial domain.

Similarly, compensation module 305 further comprises a compensation filter 1-2 configured to compensate a subframe stream (for example, subframe stream $I_2(t)$) for optical aberrations of projector 107-2, compensation filter 1-2 further configured to be applied in a frequency domain (e.g. after FFT function 315 is applied to a substream but before IFFT function 317 is applied to the substream). Similarly, compensation module 305 further comprises a compensation filter 2-2 configured to compensate a subframe stream (for example, subframe stream $I_2(t)$) for optical aberrations of projector 107-2, compensation filter 2-2 further configured to be applied in a spatial domain.

Hence, subframe stream $I_1(t)$, once enhanced and compensated by compensation filters 1-1, 2-1, is specifically configured for projection by projector 107-1. Similarly, subframe stream $I_2(t)$, once enhanced and compensated by compensation filters 1-2, 2-2, is specifically configured for projection by projector 107-2. However, when only one projector 107 is used in system 100, the compensation filters applied to each of subframe streams $I_1(t)$, $I_2(t)$ can be similar. Data representing optical aberrations of each projector 107 can be provisioned at respective compensation filters 1-1, 2-1, 1-2, 2-2 in a provisioning process (not depicted), for example by measuring such optical aberrations in each projector 107 and configuring each respective compensation filter 1-1, 2-1, 1-2, 2-2 to compensate for such optical aberrations.

Furthermore, while in FIG. 3, compensation filters are applied after the plurality of video enhancement filters, in other implementations, the compensation filters can be applied to each of subframe streams $I_1(t)$, $I_2(t)$ before the plurality of video enhancement filters. Alternatively, compensation filters can be applied to respective output subframe streams after the adaptive content selection module 307 is used to combine respective resulting enhanced subframe streams for each of subframe streams $I_1(t)$, $I_2(t)$.

In some implementations one or more of compensation filters 1-1, 2-1, 1-2, 2-2 can comprise a Wiener Deconvolution filter, but other types of compensation filters and/or deconvolution filters are within the scope of present implementations. For example, filters can be used that compensate for color differences between projectors 107.

Figure 5:
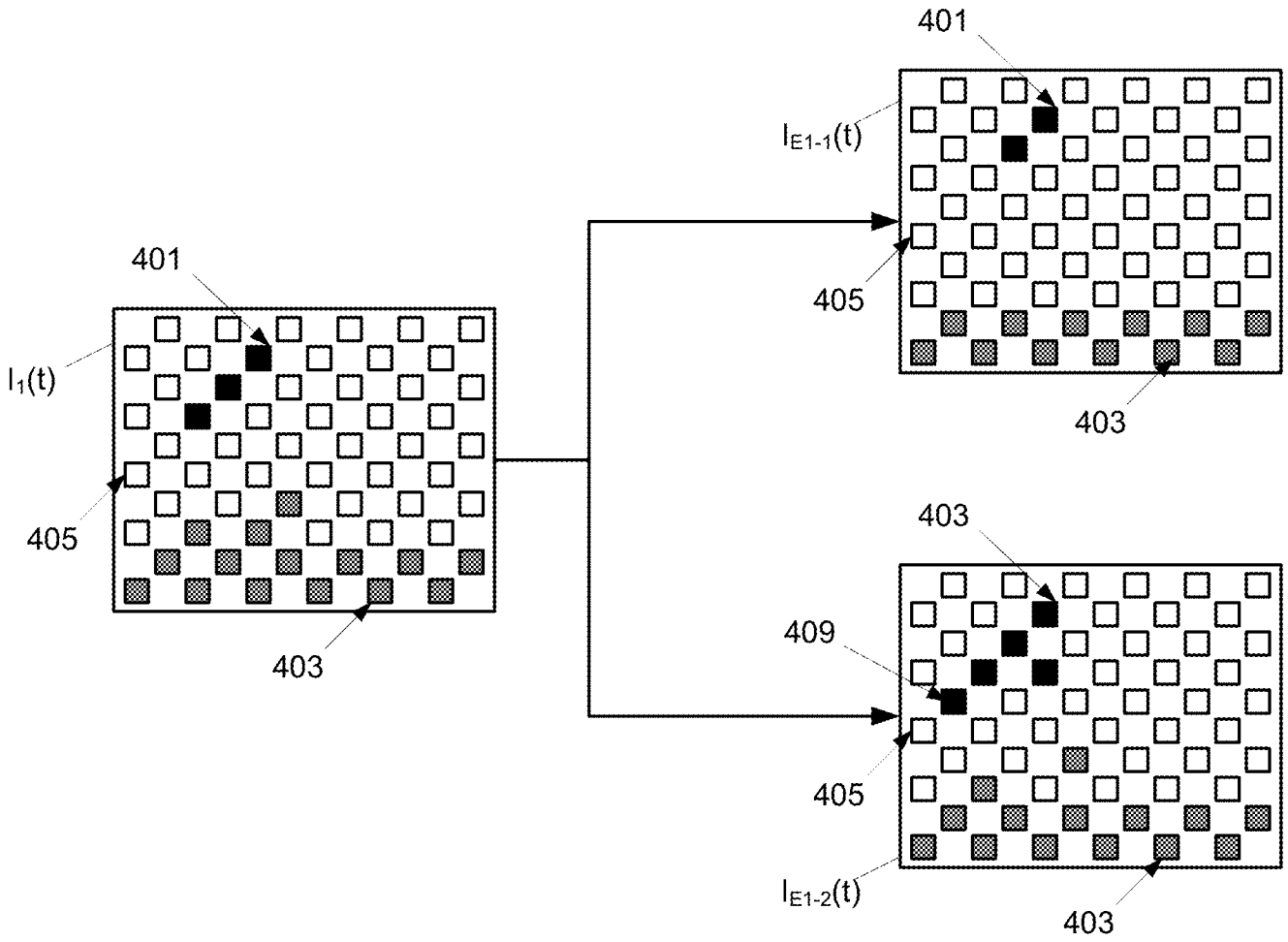
FIG. 5 depicts two enhanced subframe streams being generated from a first one of the lower resolution subframe streams of FIG. 4, a first enhanced subframe stream enhanced for moving objects, and a second enhanced subframe stream enhanced for still objects, according to non-limiting implementations.

In any event, as depicted in FIG. 5, compensation filters are applied to output from each of the plurality of video enhancement filters of video enhancement module 303 and for each of subframe streams $I_1(t)$, $I_2(t)$; and IFFT function 317 is applied to output from respective compensation filters 1-1, 1-2. This results in enhanced subframe streams being generated for each of subframe streams $I_1(t)$, $I_2(t)$ in a one-to-one relationship with the plurality of video enhancement filters. Hence, as there are two subframe streams $I_1(t)$, $I_2(t)$ and "p" video enhancement filters, "2p" resulting enhanced subframe streams are depicted.

In particular, for subframe streams $I_1(t)$, "p" enhanced subframe streams are depicted: enhanced subframe streams $I_{E1\text{-}1}(t)$, $I_{E1\text{-}2}(t)$ . . . $I_{E1\text{-}p}(t)$, one enhanced subframe stream $I_{E1}$ for each of filters $Filter_1$, $Filter_2$, . . . $Filter_p$. Similarly, for subframe streams $I_2(t)$, "p" enhanced subframe streams are depicted: enhanced subframe streams $I_{E2\text{-}1}(t)$, $I_{E2\text{-}2}(t)$ . . . $I_{E2\text{-}p}(t)$, one enhanced subframe stream $I_{E2}$ for each of filters $Filter_1$, $Filter_2$, . . . $Filter_p$.

In particular, assuming that a first video enhancement filter $Filter_1$ is for enhancing moving objects in video stream I(t), and that a second video enhancement filter $Filter_2$ is for enhancing static objects in video stream I(t), the one or more resulting enhanced subframe streams comprises a first enhanced subframe stream for the moving objects (e.g. enhanced subframe stream $I_{E1\text{-}1}(t)$ for subframe stream $I_1(t)$ and enhanced subframe stream $I_{E2\text{-}1}(t)$ for subframe stream $I_2(t)$), and a second enhanced subframe stream enhanced for the static objects (e.g. enhanced subframe stream $I_{E1\text{-}2}(t)$ for subframe stream $I_1(t)$ and enhanced subframe stream $I_{E2\text{-}2}(t)$ for subframe stream $I_2(t)$).

For example, attention is next directed to FIG. 5, which depicts subframe stream $I_1(t)$, resulting enhanced subframe stream $I_{E1\text{-}1}(t)$ (e.g. after subframe stream $I_1(t)$ has been filtered using first video enhancement filter $Filter_1$ for enhancing moving objects in video stream I(t)), and resulting enhanced subframe stream $I_{E1\text{-}2}(t)$ (e.g. after subframe stream $I_1(t)$ has been filtered using first video enhancement filter $Filter_2$ for enhancing static objects in video stream I(t)).

It is further assumed in FIG. 5 that enhanced subframe streams $I_{E1-1}(t)$, $I_{E1-2}(t)$ are in the spatial domain (e.g. after IFFT function 317 has been applied thereto) and that each of enhanced subframe streams $I_{E1-1}(t)$, $I_{E1-2}(t)$ has a similar resolution to subframe stream $I_1(t)$ and an aspect ratio similar to video stream I(t). Each of enhanced subframe streams $I_{E1-1}(t)$, $I_{E1-2}(t)$ have similar pixel registration as subframe stream $I_1(t)$.

As resulting enhanced subframe stream $I_{E1-1}(t)$ has been enhanced for moving objects, high frequency portions of moving object 401 and region 403 have been filtered out of enhanced subframe stream $I_{E1-1}(t)$, including, but not limited to, motion artifact 409. This results in high frequency motion artifacts in the lower left hand corner of moving object 401 (including, but not limited to, motion artifact 409) being filtered out and/or removed from enhanced subframe stream $I_{E1-1}(t)$. However, as first video enhancement filter $Filter_1$ is applied to the entirety of subframe stream $I_1(t)$, region 403 of enhanced subframe stream $I_{E1-1}(t)$ high frequency portions of region 403 are also filtered out and/or removed.

Similarly, as resulting enhanced subframe stream $I_{E1-2}(t)$ has been enhanced for static objects, high frequency portions of moving object 401 and region 403 have been enhanced in enhanced subframe stream $I_{E1-2}(t)$. This results in high frequency portions of region 403 of enhanced subframe stream $I_{E1-2}(t)$ being enhanced and/or edges thereof being enhanced, which can further increase contrast between region 403 and region 405. However, as second video enhancement filter $Filter_2$ is applied to the entirety of subframe stream $I_1(t)$, this also results in high frequency motion artifacts in the lower left hand corner of moving object 401 being enhanced in subframe stream $I_{E1-2}(t)$.

Figure 6:
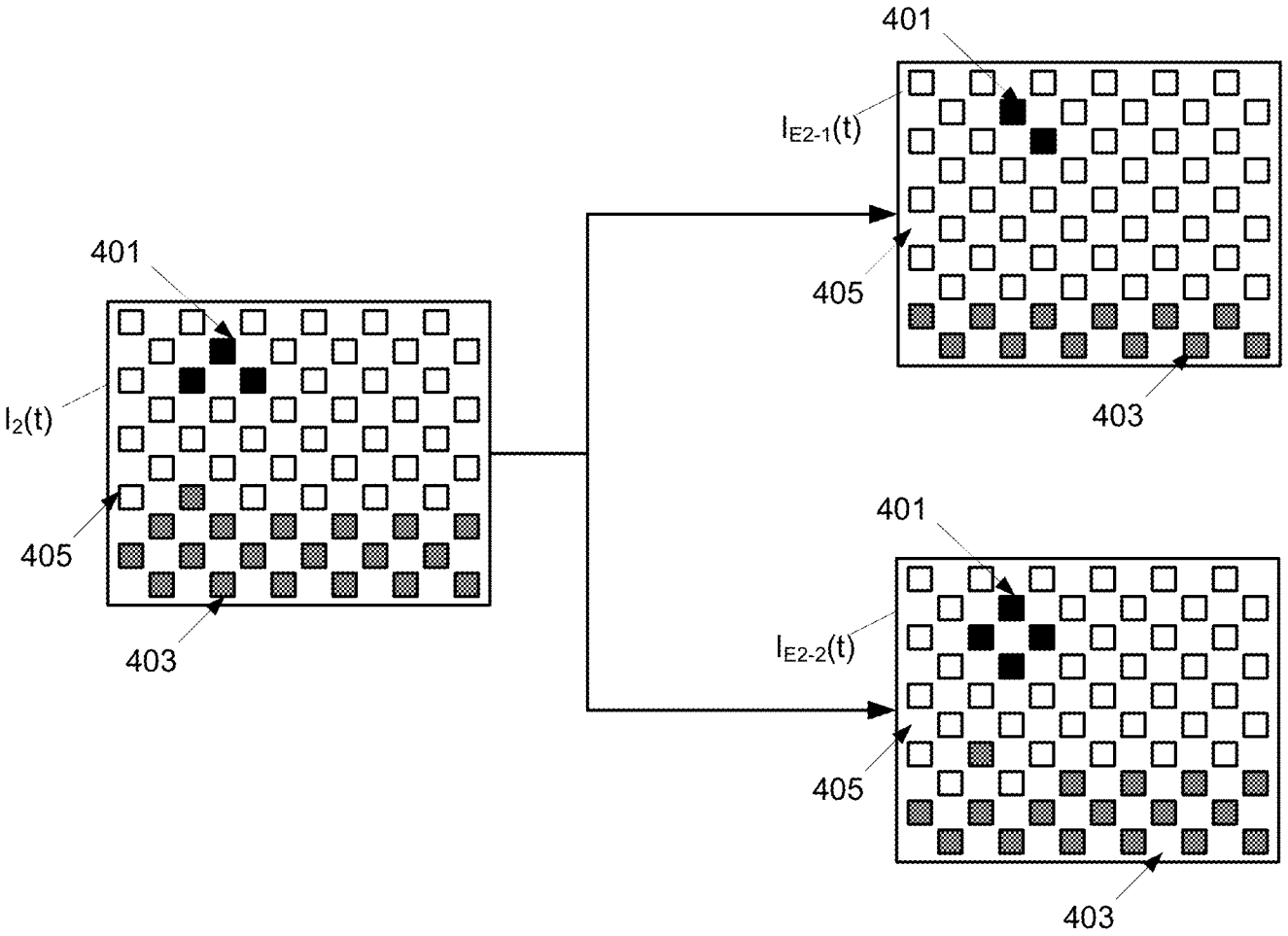
FIG. 6 depicts two enhanced subframe streams being generated from a second one of the lower resolution subframe streams of FIG. 4, a first enhanced subframe stream enhanced for moving objects, and a second enhanced subframe stream enhanced for still objects, according to non-limiting implementations.

Attention is next directed to FIG. 6, which depicts subframe stream $I_2(t)$, resulting enhanced subframe stream $I_{E2-1}(t)$ (e.g. after subframe stream $I_2(t)$ has been filtered using first video enhancement filter $Filter_1$ for enhancing moving objects in video stream I(t)), and resulting enhanced subframe stream $I_{E2-2}(t)$ (e.g. after subframe stream $I_2(t)$ has been filtered using first video enhancement filter $Filter_2$ for enhancing static objects in video stream I(t)).

It is further assumed in FIG. 6 that enhanced subframe streams $I_{E2-1}(t)$, $I_{E2-2}(t)$ are in the spatial domain (e.g. IFFT function 317 has been applied thereto) and that each of enhanced subframe streams $I_{E2-1}(t)$, $I_{E2-2}(t)$ has a similar resolution to subframe stream $I_2(t)$ and an aspect ratio similar to video stream I(t). Each of enhanced subframe streams $I_{E2-1}(t)$, $I_{E2-2}(t)$ have similar pixel registration as subframe stream $I_2(t)$.

As resulting enhanced subframe stream $I_{E2-1}(t)$ has been enhanced for moving objects, high frequency portions of moving object 401 and region 403 have been filtered out of enhanced subframe stream $I_{E2-1}(t)$. This results in high frequency motion artifacts in the lower left hand corner of moving object 401 being filtered out and/or removed from enhanced subframe stream $I_{E2-1}(t)$. However, as first video enhancement filter $Filter_1$ is applied to the entirety of subframe stream $I_2(t)$, region 403 of enhanced subframe stream $I_{E2-1}(t)$ high frequency portions of region 403 are also filtered out and/or removed.

Similarly, as resulting enhanced subframe stream $I_{E2-2}(t)$ has been enhanced for static objects, high frequency portions of moving object 401 and region 403 have been enhanced in enhanced subframe stream $I_{E2-2}(t)$. This results in high frequency portions of region 403 of enhanced subframe stream $I_{E2-2}(t)$ being enhanced and/or edges thereof being enhanced. However, as second video enhancement filter $Filter_2$ is applied to the entirety of subframe stream $I_2(t)$, this also results in high frequency motion artifacts in the lower left hand corner of moving object 401 being enhanced in subframe stream $I_{E2-2}$ (t).

While other enhanced content subframe streams are not depicted in either of FIG. 5 or FIG. 6 it is assumed that others can be present, and specifically an enhanced content subframe streams for each of the plurality of video enhancement filters. For example, a third video enhancement filter could be for enhancing text in video stream I(t), regardless of whether there is text present or not present in video stream I(t), and a third enhanced content subframe stream could be generated for each of subframe stream $I_1(t)$, $I_2(t)$ enhanced for text (again, regardless of whether text is present or not present).

Returning to FIG. 3, as depicted, adaptive content selection module 307 comprises two content selection functions 319-1, 319-2 (interchangeably referred to hereafter, collectively, as content selection functions 319 and, generically, as a content selection function 319), one for each of subframe streams $I_1(t)$, $I_2(t)$. However, when there are more than two subframe streams $I_1(t)$, $I_2(t)$, adaptive content selection module 307 can comprise a corresponding number of content selection functions 319. Alternatively, adaptive content selection module 307 which can alternate between each of subframe streams $I_1(t)$, $I_2(t)$.

In any event, each content selection function 319 is generally configured to (e.g. at block 203 of method 200) combine one or more resulting enhanced subframe streams into a respective output subframe stream based on data in one or more regions of video stream I(t), as described hereafter.

In particular, controller 101, at content estimation module 309, can be configured to determine the data in the one or more regions of video stream I(t) by comparing successive frames of video stream I(t), for example a frame at a time "t" (e.g. a frame of video stream I(t)) to a previous frame at a time "t−1" (e.g. a frame of video stream I(t−1)). For example, controller 101 can subtract successive frames and compare regions of the subtracted image to one or more thresholds to determine content of regions.

For example, such a threshold-based comparison can result in controller 101 determining that the region of video stream (t) that includes moving object 401 comprises a moving object region, while region 403 includes static objects and/or non-moving objects and hence comprises a static object region. Such a comparison can hence occur on a pixel-by-pixel basis, and a content map can result.

However, as depicted, the determined regions that include moving objects or static objects can be dilated using a "Dilation" function 320 to expand the regions both for efficiency and, for example, so that edges of moving objects are not erroneously excluded from moving object regions. For example, such a dilation function 320 can cause regions with moving objects, as determined from the comparison, be expanded (e.g. "dilated") by a given percentage (e.g. 10%, and the like, though a size of such dilation can be provisioned at controller 101, e.g. at application 136).

However, other processes for determining content of video stream I(t) are within the scope of present implementations. For example, while a threshold-based approach to comparing successive frames of video stream I(t) can be used to determine regions where moving objects are located, each frame of video stream I(t) could alternatively be compared to text functions to determine regions of text without reference to other frames. In yet further alternative implementations, each frame of video stream I(t) could alternatively be compared to color functions to determine color regions of video stream I(t).

Furthermore, where conflicts occur, controller 101 (e.g. at content estimation module 309) can be configured to resolve such conflicts, for example using weighting scheme, and the like. For example, moving objects can be given a highest weight such that when regions that include moving objects are also identified as regions of a particular color, such regions can be identified as moving object regions such that motion artifacts can be removed from such regions, as described below, rather than enhance color. Alternatively, overlapping regions can be identified.

In any event, a content map (t) can be output from content estimation module 309 to each of content selection functions 319 such that each content selection function 319 can select regions of enhanced subframe streams to combine into respective output subframe streams.

For example, attention is next directed to FIG. 7, which again depicts the frame of video stream I(t) of FIG. 4 and a content map(t) produced by content estimation module 309. In particular, content map(t) comprises two regions: a first region 701 corresponding to a region of the frame of video stream I(t) that includes moving object 401, and a second region 703 corresponding to a region of the frame of video stream I(t) that includes region 403. Each of regions 701, 703 include portions of region 405, as region 701 has been dilated to be larger than moving object 401. Furthermore, content map(t) is a function of time, and hence is provided to content selection functions 319 in conjunction with receipt of respective enhanced subframe streams which are also generated as a function of time. In other words, content map(t) represents a content map of the same frame of video stream I(t) that also corresponds to frames of subframe streams $I_1(t)$, $I_2(t)$.

Hence, content map(t) can be received at each of content selection functions 319 to select regions of enhanced subframe streams to combine into respective output subframe streams. As depicted, only regions that include moving objects and static objects have been identified, hence each of content selection functions 319 select content from respective enhanced subframe streams based on whether regions of content map(t) include moving objects or static objects, as described hereafter.

In particular, controller 101 can be further configured to combine a first enhanced subframe stream and a second enhanced subframe stream into a respective output subframe stream based on the data in the one or more regions of video stream I(t) by: determining respective regions where the moving objects and the static objects are located in the video stream I(t); and including corresponding portions of the first enhanced subframe stream in moving object regions and including corresponding portions of the second enhanced subframe stream in static object regions.

Figure 7:
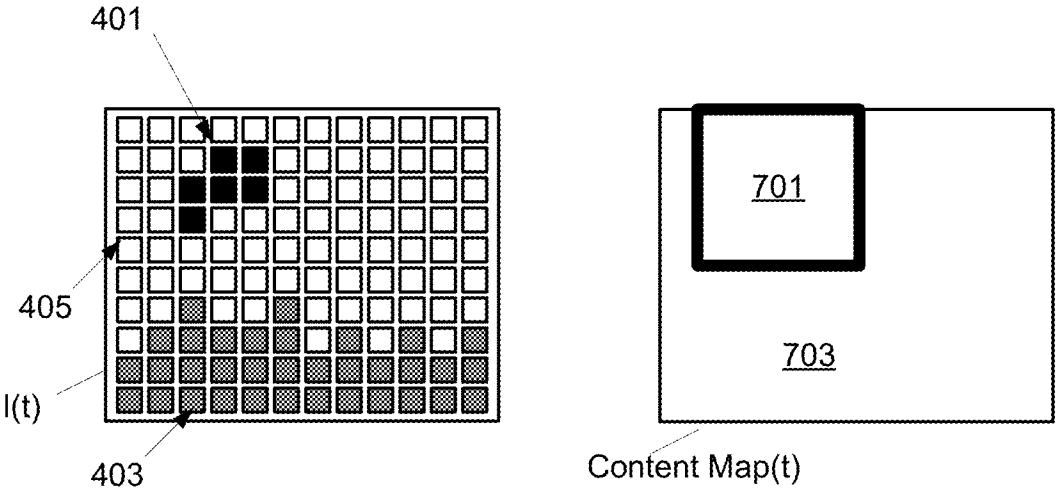
FIG. 7 depicts generation of a content map from the higher resolution video stream, according to non-limiting implementations.
Figure 8:
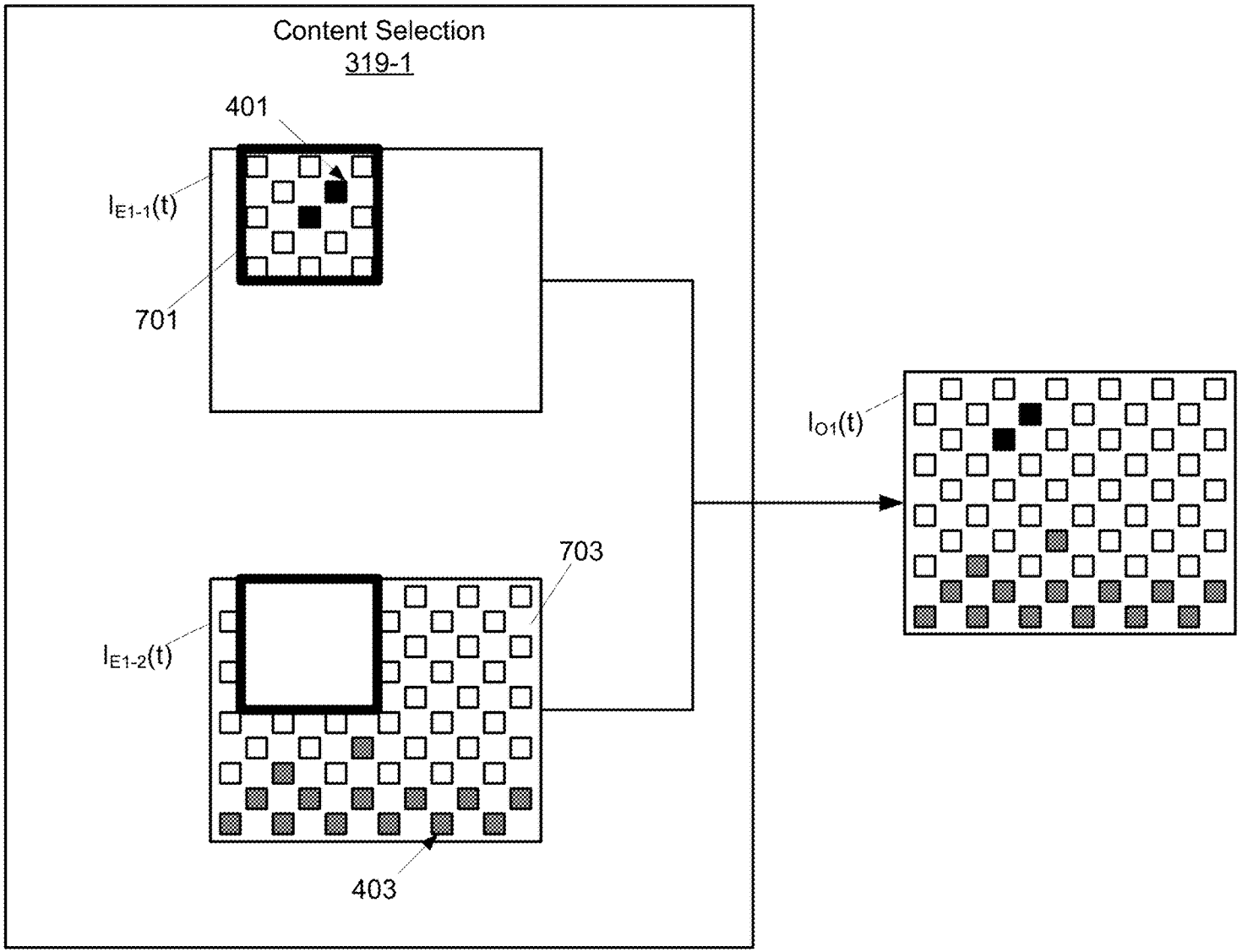
FIG. 8 depicts the content map of FIG. 7 being used to combine portions of the enhanced subframe streams of FIG. 5, each generated from a first lower resolution subframe stream of FIG. 4, into a respective output subframe stream, according to non-limiting implementations.

For example, attention is next directed to FIG. 8 which depicts functionality of content selection function 319-1, assuming that content selection region 319-1 has received enhanced subframe streams $I_{E1\text{-}1}(t)$ , $I_{E1\text{-}2}(t)$ and content map(t) as respectively depicted in FIG. 5 and FIG. 7. While other enhanced subframe streams are not depicted, it is assumed that content selection region 319-1 can also receive them; however, in the present example, only enhanced subframe streams $I_{E1\text{-}1}(t)$, $I_{E1\text{-}2}(t)$ are used as content map(t) is indicative only of a region 701 that includes moving objects, and a region 703 that includes static objects.

Furthermore, as depicted, only the pixels of enhanced subframe stream $I_{E1\text{-}1}(t)$ are shown that correspond to region 701 of content map(t), which represents a selection of a moving object portion of enhanced subframe stream $I_{E1\text{-}1}(t)$. In other words, as enhanced subframe stream $I_{E1\text{-}1}(t)$ has been enhanced for moving objects, content selection 319-1 uses content map(t) to select, from enhanced subframe stream $I_{E1\text{-}1}(t)$ portions thereof that include moving objects, but not static objects.

Similarly, only the pixels of enhanced subframe stream $I_{E1\text{-}2}(t)$ are shown that correspond to region 703 of content map(t), which represents a selection of a static object portion of enhanced subframe stream $I_{E1\text{-}2}(t)$. In other words, as enhanced subframe stream $I_{E1\text{-}2}(t)$ has been enhanced for static objects, content selection 319-1 uses content map(t) to select, from enhanced subframe stream $I_{E1\text{-}2}(t)$ portions thereof that include static objects, but not moving objects.

The selected portions of each of enhanced subframe stream $I_{E1\text{-}1}(t)$ and enhanced subframe stream $I_{E1\text{-}2}(t)$ are combined into a respective output subframe stream $I_{O1}(t)$ having a similar resolution and aspect ratio to subframe stream $I_1(t)$, with similar pixel registrations. Hence, a moving object region of respective output subframe stream $I_{O1}(t)$ is enhanced for moving objects, and a still object region of respective output subframe stream $I_{O1}(t)$ is enhanced for still objects. While not depicted, respective output subframe stream $I_{O1}(t)$ can also be compensated for optical aberrations of projector 107-1 using compensation module 305.

Figure 9:
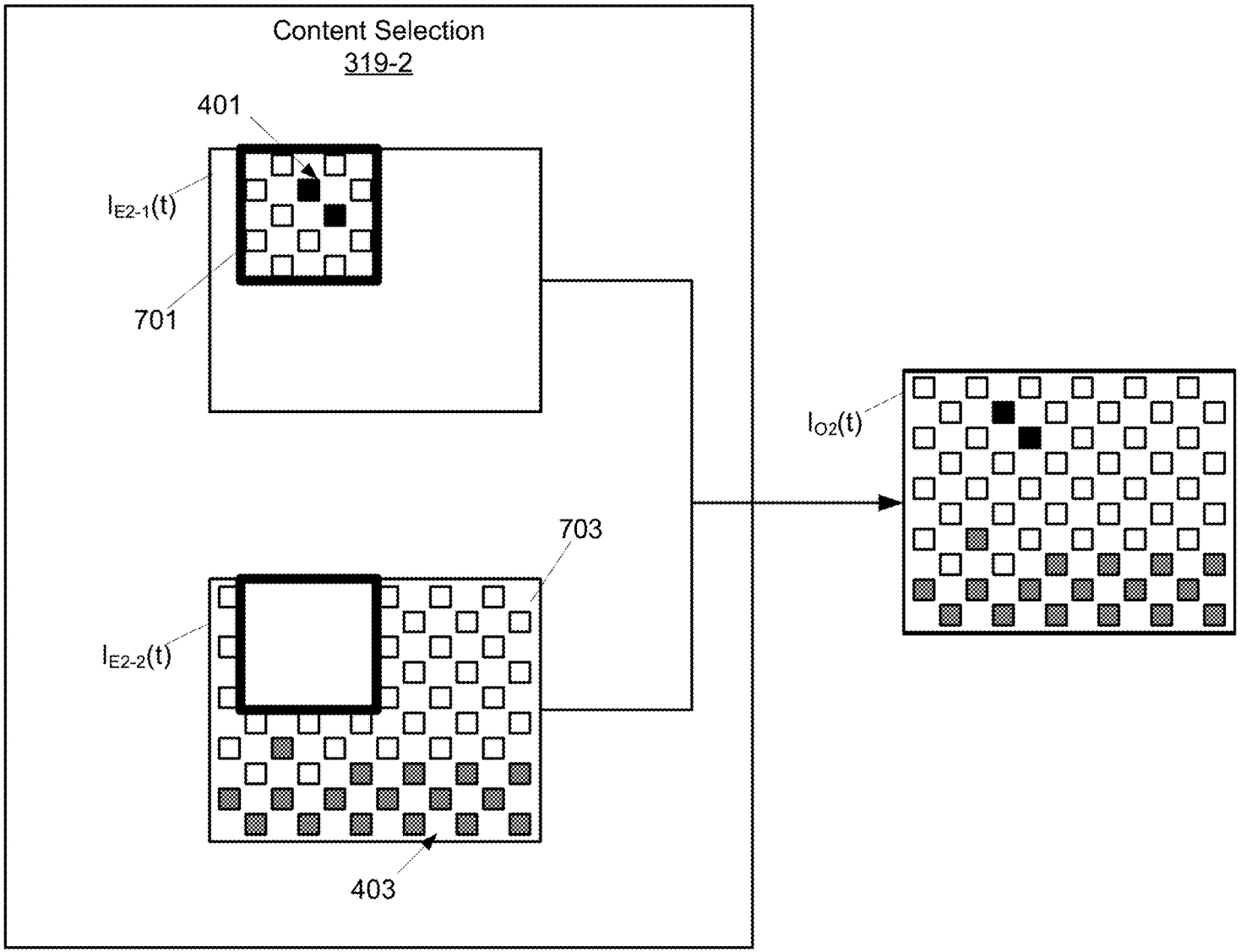
FIG. 9 depicts the content map of FIG. 7 being used to combine portions of the enhanced subframe streams of FIG. 6, each generated from a second lower resolution subframe stream of FIG. 4, into a respective output subframe stream, according to non-limiting implementations.

Similarly, attention is attention is next directed to FIG. 9 which depicts functionality of content selection function 319-2, assuming that content selection region 319-2 has received enhanced subframe streams $I_{E1\text{-}2}(t)$, $I_{E1\text{-}2}(t)$ and content map(t) as respectively depicted in FIG. 6 and FIG. 7. While other enhanced subframe streams are not depicted, it is assumed that content selection region 319-2 can also receive them; however, in the present example, only enhanced subframe streams $I_{E2\text{-}1}(t)$, $I_{E2\text{-}2}(t)$ are used as content map(t) is indicative only of a region 701 that includes moving objects, and a region 703 that includes static objects.

Furthermore, as depicted, only the pixels of enhanced subframe stream $I_{E1\text{-}2}(t)$ are shown that correspond to region 701 of content map(t), which represents a selection of a moving object portion of enhanced subframe stream $I_{E1\text{-}2}(t)$. In other words, as enhanced subframe stream $I_{E1\text{-}2}(t)$ has been enhanced for moving objects, content selection 319-2 uses content map(t) to select, from enhanced subframe stream $I_{E1\text{-}2}(t)$ portions thereof that include moving objects, but not static objects.

Similarly, only the pixels of enhanced subframe stream $I_{E1\text{-}2}(t)$ are shown that correspond to region 703 of content map(t), which represents a selection of a static object portion of enhanced subframe stream $I_{E1\text{-}2}(t)$. In other words, as enhanced subframe stream $I_{E1\text{-}2}(t)$ has been enhanced for static objects, content selection 319-2 uses content map(t) to select, from enhanced subframe stream $I_{E1\text{-}2}(t)$ portions thereof that include static objects, but not moving objects.

The selected portions of each of enhanced subframe stream $I_{E1\text{-}2}(t)$ and enhanced subframe stream $I_{E1\text{-}2}(t)$ are combined into a respective output subframe stream $I_{O2}(t)$ having a similar resolution and aspect ratio to subframe stream $I_2(t)$, with similar pixel registrations. Hence, a moving object region of respective output subframe stream $I_{O2}(t)$ is enhanced for moving objects, and a still object region of respective output subframe stream $I_{O2}(t)$ is enhanced for still objects. While not depicted, respective output subframe stream $I_{O2}(t)$ can also be compensated for optical aberrations of projector 107-2 using compensation module 305.

While not depicted, in some implementations content map(t) can includes overlapping regions, for example, a region identified as including a moving object can overlap with a region identified as being of a particular color. In these implementations, an output subframe streams can again be filtered using one or more respective video enhancement filters of video enhancement module 303 and enhanced color regions can be selected from the resulting enhanced subframe streams using content selection functions 319. In other words, aspects of method 200 can be repeated to enhance different types of features in subframe streams $I_1(t)$, $I_2(t)$ which overlap.

Figure 10:
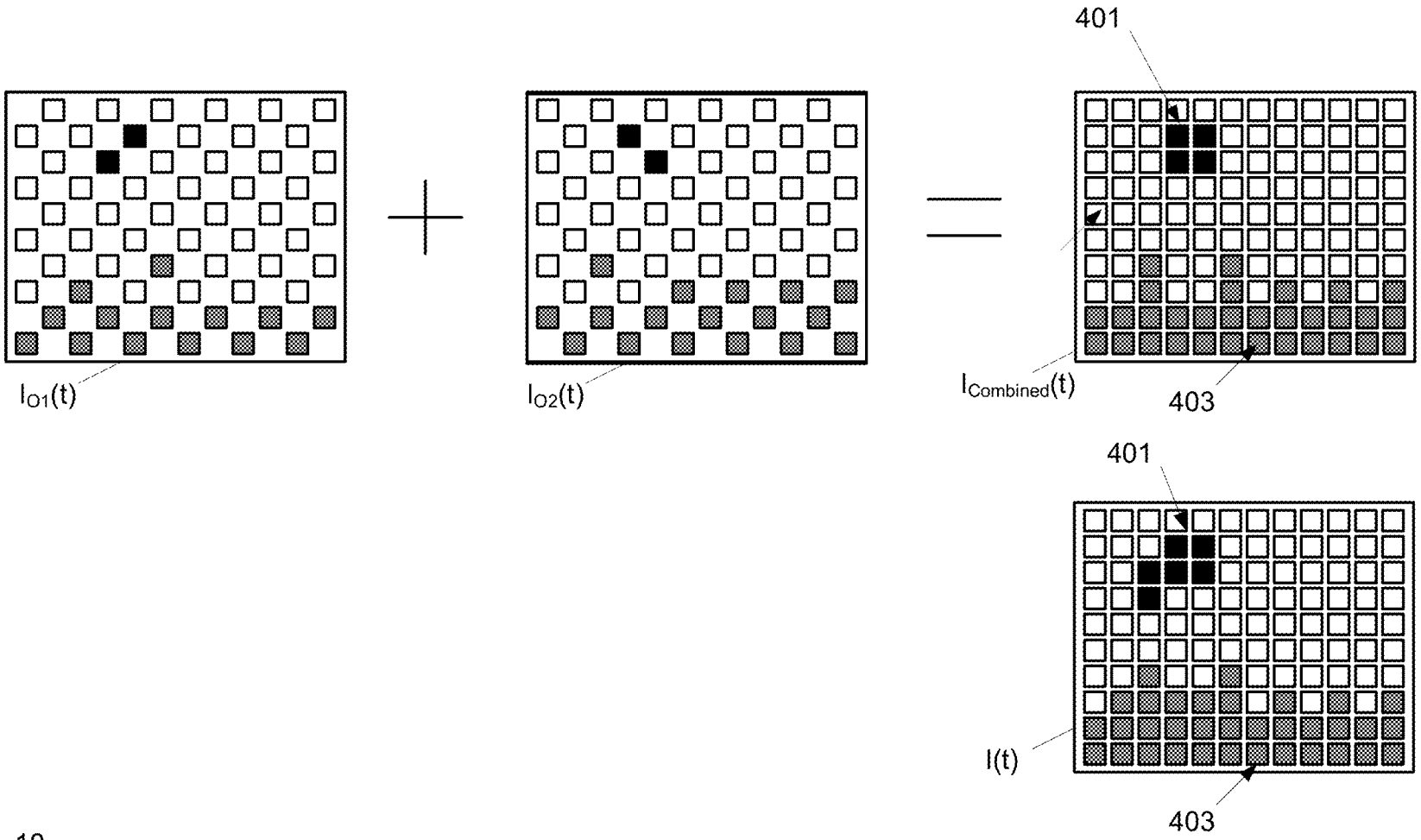
FIG. 10 depicts the two respective output subframe streams being combined into a combined higher resolution video stream, as well as a comparison with the original higher resolution video stream, according to non-limiting implementations.

Attention is next directed to FIG. 10, which depicts a comparison of respective output subframe streams $I_{O1}(t)$, $I_{O2}(t)$. In particular, when respective output subframe streams $I_{O1}(t)$, $I_{O2}(t)$ are added together, for example by co-projecting images formed therefrom each using projectors 107, respective output subframe streams $I_{O1}(t)$, $I_{O2}(t)$ form a video stream $I_{Combined}(t)$ having moving objects enhanced and static objects enhanced, at a resolution and aspect ratio similar to video stream I(t).

In particular, FIG. 10 depicts a frame of video stream $I_{Combined}(t)$ that corresponds to the frame from video stream I(t) as depicted in FIG. 4, which is also depicted for comparison. In the frame from video stream $I_{Combined}(t)$, high frequency motion artifacts are removed from moving object 401 (as compared to video stream I(t)), and furthermore edges of static region 403 are enhanced in the frame of video stream $I_{Combined}(t)$ (as compared to video stream I(t)).

Hence, FIGS. 4 through 10 depict a specific non-limiting example of block 203 of method 200 in which two video enhancement filters are applied to each of each of a plurality of subframe streams $I_1(t)$, $I_2(t)$, each of the plurality of video enhancement filters for enhancing different features of the video stream and specifically moving objects and still objects. As well, one or more resulting enhanced subframe streams are combined into a respective output subframe stream $I_{O1}(t)$, $I_{O2}(t)$ based on data in one or more regions of the video stream I(t), for example as represented by content map(t). While as depicted, each respective output subframe stream $I_{O1}(t)$, $I_{O2}(t)$ comprises portions of two enhanced subframe streams, in other implementations, an output subframe stream can comprise portions of only one enhanced subframe stream (e.g. an enhanced subframe stream that has been enhanced for only static objects when video stream I(t) includes no moving objects), or more than two enhanced subframe streams (e.g. enhanced for moving objects, static objects and text, as well as any other types of features).

Figure 11:
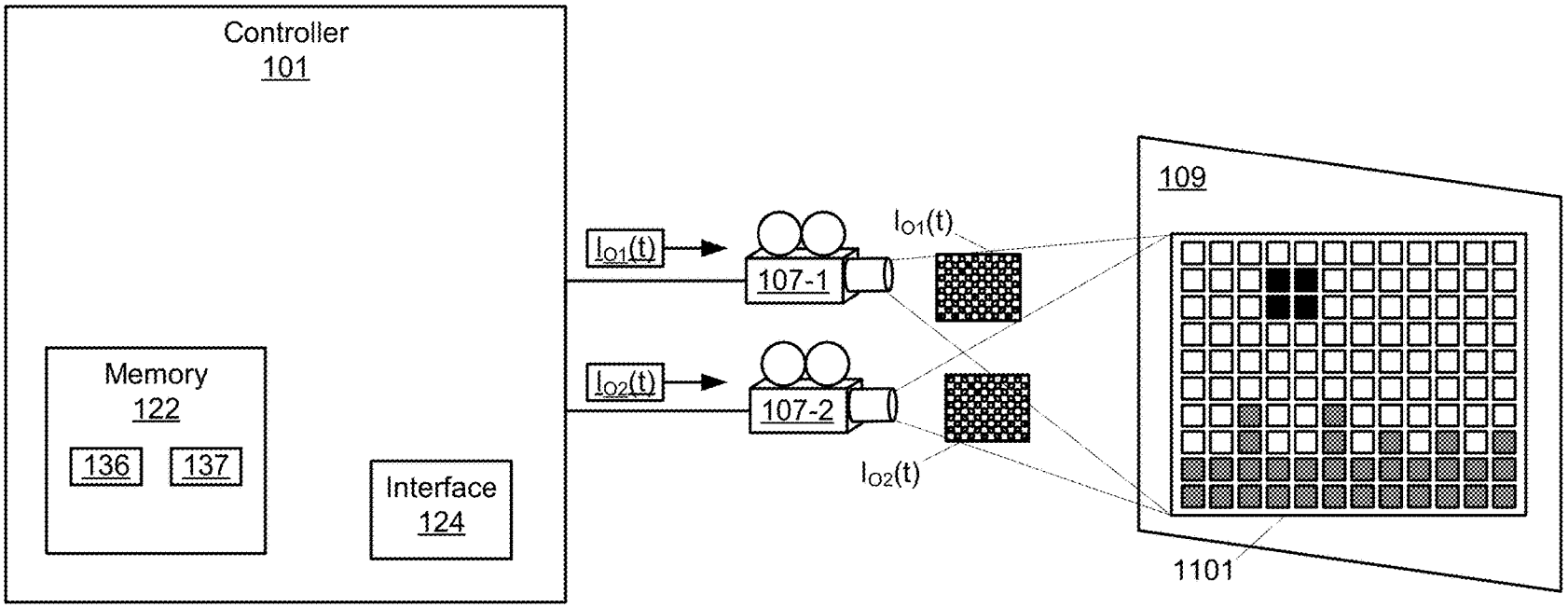
FIG. 11 depicts the two respective output subframe streams being projected in the system of FIG. 1, according to non-limiting implementations.

Attention is next directed to FIG. 11, which is substantially similar to FIG. 1, with like elements having like numbers, and depicts a specific non-limiting implementation of block 207 of method 200. In particular, FIG. 11 depicts controller 101 controlling (e.g. using communication interface 124 to communicate with projectors 107) one or more projectors 107 to project the plurality of output subframe streams $I_{O1}(t)$, $I_{O2}$ (thereby combining the plurality of output subframe streams $I_{O1}(t)$, $I_{O2}(t)$ into a higher resolution projected video stream, for example as represented by video stream $I_{Combined}(t)$. Hence video stream $I_{Combined}(t)$ is provided at screen 109. In particular, controller 101 can transmit output subframe stream $I_{O1}(t)$ to projector 107-1, and transmit output subframe stream $I_{O2}(t)$ to projector 107-2. Furthermore, projectors 107 use the different pixel registrations of each of output subframe streams $I_{O1}(t)$, $I_{O2}(t)$ to project output subframe streams $I_{O1}(t)$, $I_{O2}(t)$ such that they are shifted from one another.

Hence, in the implementations depicted in FIG. 11, it is assumed that projectors 107 are configured to project output subframe streams $I_{O1}(t)$, $I_{O2}(t)$ shifted from one another (e.g. using the pixel registrations thereof) so that they are combined into a higher resolution image 1101 at screen 109 which is similar to $I_{Combined}(t)$.

However, in implementations where one projector 107 is used to project both of output subframe streams $I_{O1}(t)$, $I_{O2}(t)$, respective frames of output subframe streams $I_{O1}(t)$, $I_{O2}(t)$ can be projected successively by the one projector 107 such that an eye blends output subframe streams $I_{O1}(t)$, $I_{O2}(t)$ together. In some of these implementations, to achieve shifting of output subframe streams $I_{O1}(t)$, $I_{O2}(t)$ with respect to one another, the one projector 107 can comprise an opto-mechanical shifter to shift output subframe streams $I_{O1}(t)$, $I_{O2}(t)$.

As described above, implementations of block 201 described with respect to FIG. 4 is a non-limiting example which shows aspects of the present specification. However, in other implementations, every other pixel is not extracted from video stream I(t) to produce subframe streams $I_1(t)$, $I_2(t)$; rather video stream I(t) can be sampled to generate subframe streams $I_1(t)$, $I_2(t)$ having lower resolution pixel registrations, with pixels of each of subframe streams $I_1(t)$, $I_2(t)$ arranged in a grid.

Figure 12:
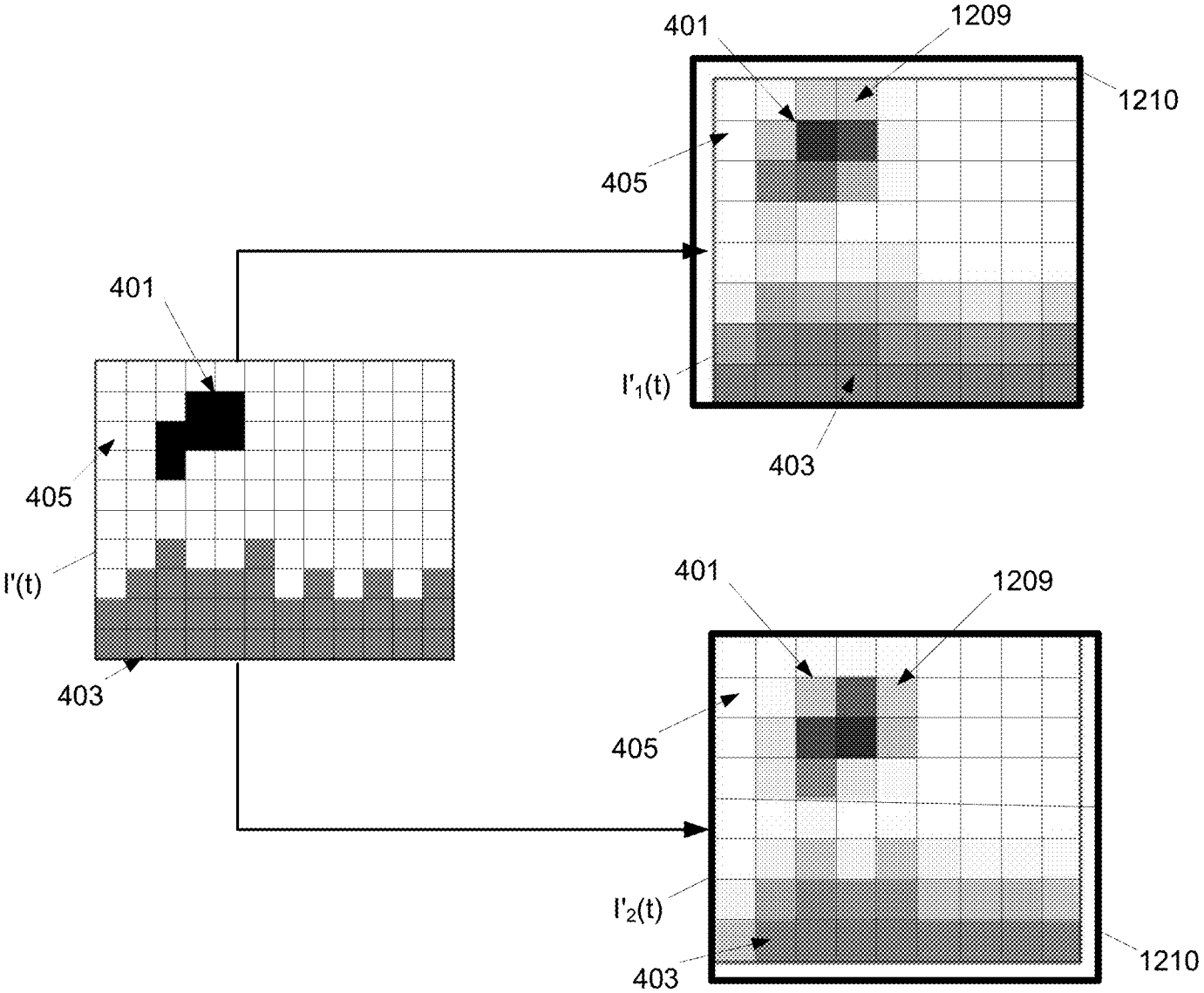
FIG. 12 depicts two lower resolution subframe streams being generated from a higher definition video stream, according to alternative non-limiting implementations.

For example, attention is next directed to FIG. 12 which depicts a higher definition video stream I'(t), similar to video stream I(t), used to generate two lower resolution subframe streams $I'_1(t)$, $I'_2(t)$, according to alternative non-limiting implementations. In contrast to subframe streams $I_1(t)$, $I_2(t)$ of FIG. 4, in both subframe streams $I'_1(t)$, $I'_2(t)$ all the pixels are "on", and are pixel-shifted diagonally so centers of pixels in one subframe streams $I'_1(t)$, $I'_2(t)$ line up with corners of pixels in the other of subframe streams $I'_1(t)$, $I'_2(t)$. To clarify this half-pixel shifting, a position of each of subframe streams $I'_1(t)$, $I'_2(t)$ is depicted relative to a common reference border 1210. Furthermore, rather than every second pixel of video stream I'(t) being selected to generate subframe streams $I'_1(t)$, $I'_2(t)$ (as with subframe streams $I_1(t)$, $I_2(t)$ of FIG. 4), subframe streams $I'_1(t)$, $I'_2(t)$ are generated by sampling and/or upsampling video stream I'(t) and downsampling to generate lower resolution subframe streams $I'_1(t)$, $I'_2(t)$ pixel shifted from one another, with a linear resolution of each of subframe streams $I'_1(t)$, $I'_2(t)$ being about $1/\sqrt{2}$ of an input linear resolution of video stream I'(t) and pixel shifting between each of subframe streams $I'_1(t)$, $I'_2(t)$ being about ½ pixel of the output linear resolution. Hence, upscaling of video stream I' (t) by a factor of $\sqrt{2}$ occurs using interpolation, a pixel shift of 1 pixel occurs to produce two intermediate subframe streams, each of which are downscaled by a factor of 2 to produce subframe streams $I'_1(t)$, $I'_2(t)$. Hence, pixels of each of subframe streams $I'_1(t)$, $I'_2(t)$ are arranged in a grid rather than a checkerboard pattern (in contrast to subframe streams $I_1(t)$, $I_2(t)$.

Furthermore, values of each pixel of each of subframe streams $I'_1(t)$, $I'_2(t)$ are determined using average values used for pixels at edges of features of video stream I'(t). For example, values of pixels for each of subframe streams $I'_1(t)$, $I'_2(t)$ can be determined by averaging and/or linear averaging the values of respective corresponding pixels of video stream I' (t). Hence, while more detail of features in video stream I' (t) occur in subframe streams $I'_1(t)$, $I'_2(t)$ (at least compared to subframe streams $I_1(t)$, $I_2(t)$ of FIG. 4), such detail can occur at reduced contrast (e.g. fine black and white stripes in higher resolution video stream I'(t) would become fine darker grey and lighter grey stripes (e.g. features 1209) in the pixel-shifted lower resolution subframe streams $I'_1(t)$, $I'_2(t)$. In addition, while averaging and/or linear averaging can be used to determine values of pixels of each of subframe streams $I'_1(t)$, $I'_2(t)$, other resampling techniques can be used including, but not limited to, using curves to approximate natural surfaces for interpolation. Indeed, the various image processing techniques and filters referred herein can specifically be used to attempt to increase the contrast of fine grey-on-grey features; however other image processing techniques and/or filters can be used to enhance other types of features.

Once subframe streams $I'_1(t)$, $I'_2(t)$ are generated (e.g. at block 201 of method 200), the remainder of method 200 occurs as described above. Furthermore, when the resulting plurality of output subframe streams are projected at block 207 of method 200, they are projected using corresponding pixel registrations to overlap and combine the plurality of output subframe streams into a higher resolution projected video stream. In other words, the resulting plurality of output subframe streams are projected shifted with respect to one another such that each enhance and fill in details of the others. In particular, a common reference border (corresponding to the common reference border 1210) of each of the plurality of output subframe streams would be aligned such that the features of each overlap to form the higher resolution projected video stream.

Described herein is a system that can increase an apparent displayed and/or projected resolution of high resolution video when rendered by one or more projectors with lower resolutions while managing the resulting motion artifacts. The system can decompose each high resolution video frame into two or more lower resolution subframes that, when superimposed by the projector(s) during a projection, appears with a perceptually higher resolution and contrast gain closer to the original high resolution video content. The subframes are generated by incorporating content-adaptive filters mechanisms which can be based on motion characteristics of the content being displayed to reduce motion artifacts, particularly for moving content with high frequency and fine-grained characteristics, as well as on a projector's optical characteristics. For example, in a particular non-limiting implementation, two WQXGAHD (wide-quad-extended-graphics-array) subframe streams can be produced from a UHD (ultra-high-definition) video stream and the two WQXGA subframe streams can be projected by one or more projectors to produce video stream that appears, to the human eye, at a resolution similar to the original UHD video stream. Furthermore, the present specification can provide resolution enhancement for one or more projectors, while accounting for motion characteristics of the content as well as the optical properties of the projector(s). Resolution enhancement can be achieved with video content that includes both static objects and moving objects; indeed, as the video enhancement filters are applied frame-by-frame, the motion of such objects can be arbitrary and the enhancement thereof can still be achieved. As the video enhancement filters can include a motion video enhancement filter and a still object video enhancement filter which can be combined into one output subframe stream, motion artifacts can be while maintaining and/or enhancing contrast, and the like, of other portions of the output subframe stream.

Those skilled in the art will appreciate that in some implementations, the functionality controller 101 can be implemented using pre-programmed hardware or firmware elements (e.g., application specific integrated circuits (ASICs), electrically erasable programmable read-only memories (EEPROMs), etc.), or other related components. In other implementations, the controller 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive, flash storage and the like, including any hardware component configured to store computer-readable program code in a fixed, tangible, readable manner). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:

a controller and a communication interface configured to communicate with one or more projectors, the controller configured to:

generate a plurality of subframe streams from a video stream; each of the plurality of subframe streams comprising a lower resolution version of the video stream, pixel-shifted from one another;

generate a plurality of output subframe streams from the plurality of subframe streams in a one-to-one relationship by: applying a plurality of video enhancement filters to each of the plurality of subframe streams by: converting each of the plurality of subframe streams from a spatial domain to a frequency domain; applying a respective video enhancement filter in the frequency domain; and converting the respective output subframe stream back to the spatial domain, each of the plurality of video enhancement filters for enhancing different features of the video stream; and, combining one or more resulting enhanced subframe streams into a respective output subframe stream based on data in one or more regions of the video stream; [and,]

control, using the communication interface, the one or more projectors to project the plurality of output subframe streams, thereby combining the plurality of output subframe streams into a higher resolution projected video stream, *wherein: the plurality of video enhancement filters comprises: a first enhancement video filter for enhancing moving objects in the video stream, and a second enhancement video filter for enhancing static objects in the video stream, and the one or more resulting enhanced subframe stream comprises a first enhanced subframe stream for the moving objects, and a second enhanced subframe stream enhanced for the static objects;*

*combine the first enhanced subframe stream and the second enhanced subframe stream into the respective*

*output subframe stream based on the data in the one or more regions of the video stream by: determining respective regions where the moving objects and the static objects are located in the video stream; and including corresponding portion of the first enhanced subframe stream in moving object regions and including corresponding portions of the second enhanced subframe stream in static objects regions.*

2. The device of claim 1, wherein the controller is further configured to generate the plurality of subframe streams by one more of resampling, upsampling and downsampling the video stream.

3. The device of claim 1, wherein the controller is further configured to apply one or more of the plurality of video enhancement filters to each of the plurality of subframe streams by: applying a further respective video enhancement filter in a spatial domain.

[4. The device of claim 1, wherein the plurality of video enhancement filters comprises: a first enhancement video filter for enhancing moving objects in the video stream, and a second enhancement video filter for enhancing static objects in the video stream.]

[5. The device of claim 4, wherein the one or more resulting enhanced subframe streams comprises a first enhanced subframe stream enhanced for the moving objects, and a second enhanced subframe stream enhanced for the static objects.]

[6. The device of claim 5, wherein the controller is further configured to combine the first enhanced subframe stream and the second enhanced subframe stream into the respective output subframe stream based on the data in the one or more regions of the video stream by: determining respective regions where the moving objects and the static objects are located in the video stream; and including corresponding portions of the first enhanced subframe stream in moving object regions and including corresponding portions of the second enhanced subframe stream in static object regions.]

7. The device of claim 1, wherein the controller is further configured to determine the data in the one or more regions of the video stream by comparing successive frames of the video stream.

8. The device of claim 1, wherein the plurality of video enhancement filters comprises one or more of: a moving object video enhancement filter, a static object video enhancement filter, a text enhancement filter, a texture enhancement filter, and a color enhancement filter.

9. The device of claim 1, wherein the controller is further configured to apply a compensation filter to each of respective enhanced subframe streams, the compensation filter for compensating for optical aberrations of the one or more projectors.

10. A method comprising:

at a device configured to communicate with one or more projectors, generating, at the device, a plurality of subframe streams from a video stream; each of the plurality of subframe streams comprising a lower resolution version of the video stream, pixel-shifted from one another;

generating, at the device, a plurality of output subframe streams from the plurality of subframe streams in a one-to-one relationship by: applying a plurality of video enhancement filters to each of the plurality of subframe streams by: converting each of the plurality of subframe streams from a spatial domain to a frequency domain; applying a respective video enhancement filter in the frequency domain; and converting the respective output subframe stream back to the spatial domain, each of the plurality of video enhancement filters for enhancing different features of the video stream; and, combining one or more resulting enhanced subframe streams into a respective output subframe stream based on data in one or more regions of the video stream; [and,]

controlling, using the device, the one or more projectors to project the plurality of output subframe streams, thereby combining the plurality of output subframe streams into a higher resolution projected video stream, *wherein: the plurality of video enhancement filters comprises: a first enhancement video filter for enhancing moving objects in the video stream, and a second enhancement video filter for enhancing static objects in the video stream, the one or more resulting enhanced subframe streams comprises a first enhanced subframe stream enhanced for the moving objects, and a second enhanced Subframe stream enhanced for the static objects; and*

*Combining at the device, the first enhance subframe stream and the second enhanced subframe stream into the respective output subframe stream based on the data in the one or more regions of the video stream by: determining respective regions where the moving objects and the static objects are located in the video stream; and including corresponding portions of the first enhanced subframe stream in moving object regions and including corresponding portions of the second enhanced subframe stream in static object regions.*

11. The method of claim 10, further comprising generating, at the device, the plurality of subframe streams by one more of resampling, upsampling and downsampling the video stream.

12. The method of claim 10, further comprising applying, at the device, one or more of the plurality of video enhancement filters to each of the plurality of subframe streams by: applying a further respective video enhancement filter in a spatial domain.

[13. The method of claim 10, wherein the plurality of video enhancement filters comprises: a first enhancement video filter for enhancing moving objects in the video stream, and a second enhancement video filter for enhancing static objects in the video stream.]

[14. The method of claim 13, wherein the one or more resulting enhanced subframe streams comprises a first enhanced subframe stream enhanced for the moving objects, and a second enhanced subframe stream enhanced for the static objects, and the method further comprising combining, at the device, the first enhanced subframe stream and the second enhanced subframe stream into the respective output subframe stream based on the data in the one or more regions of the video stream by: determining respective regions where the moving objects and the static objects are located in the video stream; and including corresponding portions of the first enhanced subframe stream in moving object regions and including corresponding portions of the second enhanced subframe stream in static object regions.]

15. The method of claim 10, further comprising determining, at the device, the data in the one or more regions of the video stream by comparing successive frames of the video stream.

16. The method of claim 10, wherein the plurality of video enhancement filters comprises one or more of: a moving object video enhancement filter, a static object video enhancement filter, a text enhancement filter, a texture enhancement filter, and a color enhancement filter.

17. The method of claim 10, further comprising applying, at the device, a compensation filter to each of respective enhanced subframe streams, the compensation filter for compensating for optical aberrations of the one or more projectors.

18. A non-transitory computer-readable medium storing a computer program, wherein execution of the computer program is for:

at a device configured to communicate with one or more projectors, generating, at the device, a plurality of subframe streams from a video stream; each of the plurality of subframe streams comprising a lower resolution version of the video stream, pixel-shifted from one another;

generating, at the device, a plurality of output subframe streams from the plurality of subframe streams in a one-to-one relationship by: applying a plurality of video enhancement filters to each of the plurality of subframe streams by: converting each of the plurality of subframe streams from a spatial domain to a frequency domain; applying a respective video enhancement filter in the frequency domain; and converting the respective output subframe stream back to the spatial domain, each of the plurality of video enhancement filters for enhancing different features of the video stream; and, combining one or more resulting enhanced subframe streams into a respective output subframe stream based on data in one or more regions of the video stream; [and,]

controlling, using the device, the one or more projectors to project the plurality of output subframe streams, thereby combining the plurality of output subframe streams into a higher resolution projected video stream,

*wherein, the plurality of video enhancement filter comprises a first enhancement video filter for enhancing moving objects in the video stream, and second enhancement video filter for enhancing static objects in the video stream, the one or more resulting enhanced subframe streams comprises a first enhanced subframe stream enhanced for the moving objects, and a second enhanced subframe stream enhanced for the static objects; and*

*Combing, at the device, the first enhanced subframe stream and the second enhanced subframe stream into the respective output subframe stream based on the data in the one or more regions of the video stream by, determining respective regions where the moving objects and the static objects are located in the video stream; and including corresponding portions of the first enhanced subframe stream in moving object regions and including corresponding portions of the second enhanced, subframe stream in static object regions.*

*19. The non-transitory computer-readable medium of claim 18, wherein execution of the computer program further comprises generating, at the device, the plurality of subframe streams by one more of resampling, upsampling and downsampling the video stream.*

*20. The non-transitory computer-readable medium of claim 18, wherein execution of the computer program further comprises applying, at the device, one or more of the plurality of video enhancement filters to each of the plurality of subframe streams by applying a further respective video enhancement filter in a spatial domain.*

* * * * *